(12) United States Patent
Uno et al.

(10) Patent No.: US 11,210,762 B2
(45) Date of Patent: Dec. 28, 2021

(54) INFORMATION PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventors: Yukiko Uno, Tokyo (JP); Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/778,663

(22) Filed: Jan. 31, 2020

(65) Prior Publication Data

US 2020/0250792 A1 Aug. 6, 2020

(30) Foreign Application Priority Data

Feb. 5, 2019 (JP) .............................. JP2019-019070
Feb. 5, 2019 (JP) .............................. JP2019-019072

(51) Int. Cl.
*G09G 5/00* (2006.01)
*G06T 1/60* (2006.01)
(Continued)

(52) U.S. Cl.
CPC .............. *G06T 1/60* (2013.01); *H04N 9/646* (2013.01); *H04N 9/73* (2013.01); *H04N 9/77* (2013.01)

(58) Field of Classification Search
CPC ........... H04N 5/23245; H04N 2101/00; H04N 19/136; H04N 1/00461; H04N 5/23216;
(Continued)

(56) References Cited

U.S. PATENT DOCUMENTS 10,404,923 B1 * 9/2019 Pena ................. H04N 5/232939
2016/0314819 A1 * 10/2016 Elsner ................. H04N 19/136
(Continued)

FOREIGN PATENT DOCUMENTS

| JP | 2007-110221 A | 4/2007 |
| JP | 2008-097141 A | 4/2008 |
| KR | 2015-0064528 A | 6/2015 |

OTHER PUBLICATIONS

U.K. Search Report dated Jul. 15, 2020, that issued in the corresponding U.K. Patent Application No. 2000590.6.

*Primary Examiner* — Hau H Nguyen
(74) *Attorney, Agent, or Firm* — Cowan, Liebowitz & Latman, P.C.

(57) ABSTRACT

This invention provides an apparatus that carries out a playback process on a RAW moving-image, where the apparatus comprises an image processing unit for generating a processed moving image by carrying out image processing, including a developing process, on the RAW moving-image; a memory for storing the processed moving image; and a display control unit for carrying out control so that a bar corresponding to the length of a time axis of the RAW moving-image is displayed, wherein the display control unit displays a processable range, which is a range for which, of the RAW moving-image, the moving image subject to the image processing by the image processing unit can be temporarily stored in the memory, along with the bar, before the image processing on the RAW moving-image in that processable range ends.

19 Claims, 20 Drawing Sheets

(51) Int. Cl.
*H04N 9/77* (2006.01)
*H04N 9/73* (2006.01)
*H04N 9/64* (2006.01)

(58) Field of Classification Search
CPC ....... H04N 5/232933; H04N 5/232939; H04N 5/765; H04N 5/77; G06T 1/60; G06F 3/04817
See application file for complete search history.

(56) References Cited

U.S. PATENT DOCUMENTS

2017/0150091 A1* 5/2017 Nakase ................ H04N 5/772
2017/0289619 A1* 10/2017 Xu ....................... H04N 21/251

* cited by examiner

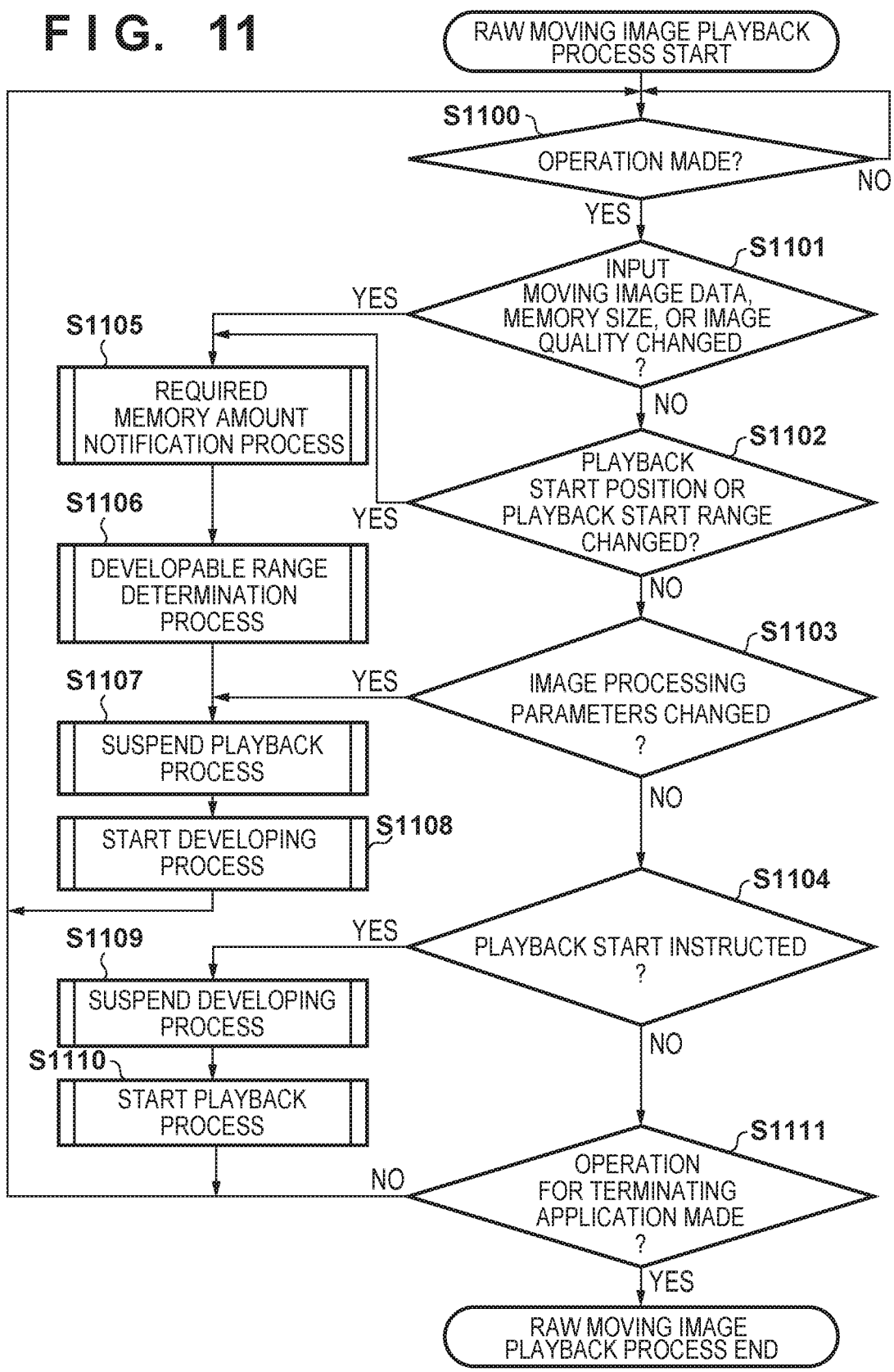

FIG. 13A

THERE IS INSUFFICIENT MEMORY TO PROCESS
THE DESIGNATED RANGE.
WOULD YOU LIKE TO CHANGE THE SETTINGS TO
ALLOCATE THE REQUIRED MEMORY AMOUNT?

CURRENT MEMORY: 1.5 GB
   REQUIRED MEMORY: 1.8 GB

[CHANGE SETTINGS] [CHANGE ONLY THIS CLIP] [NO]

FIG. 13B

NOT ENOUGH MEMORY CAN BE SECURED TO PROCESS
THE SPECIFIED RANGE IN THIS ENVIRONMENT.
WOULD YOU LIKE TO CHANGE THE SETTINGS TO ALLOCATE
THE UPPER LIMIT ON THE MEMORY THAT CAN BE SECURED?

CURRENT MEMORY: 1.5 GB
   REQUIRED MEMORY: 1.8 GB
   MEMORY THAT CAN BE SECURED: 1.6 GB

[CHANGE SETTINGS] [CHANGE ONLY THIS CLIP] [NO]

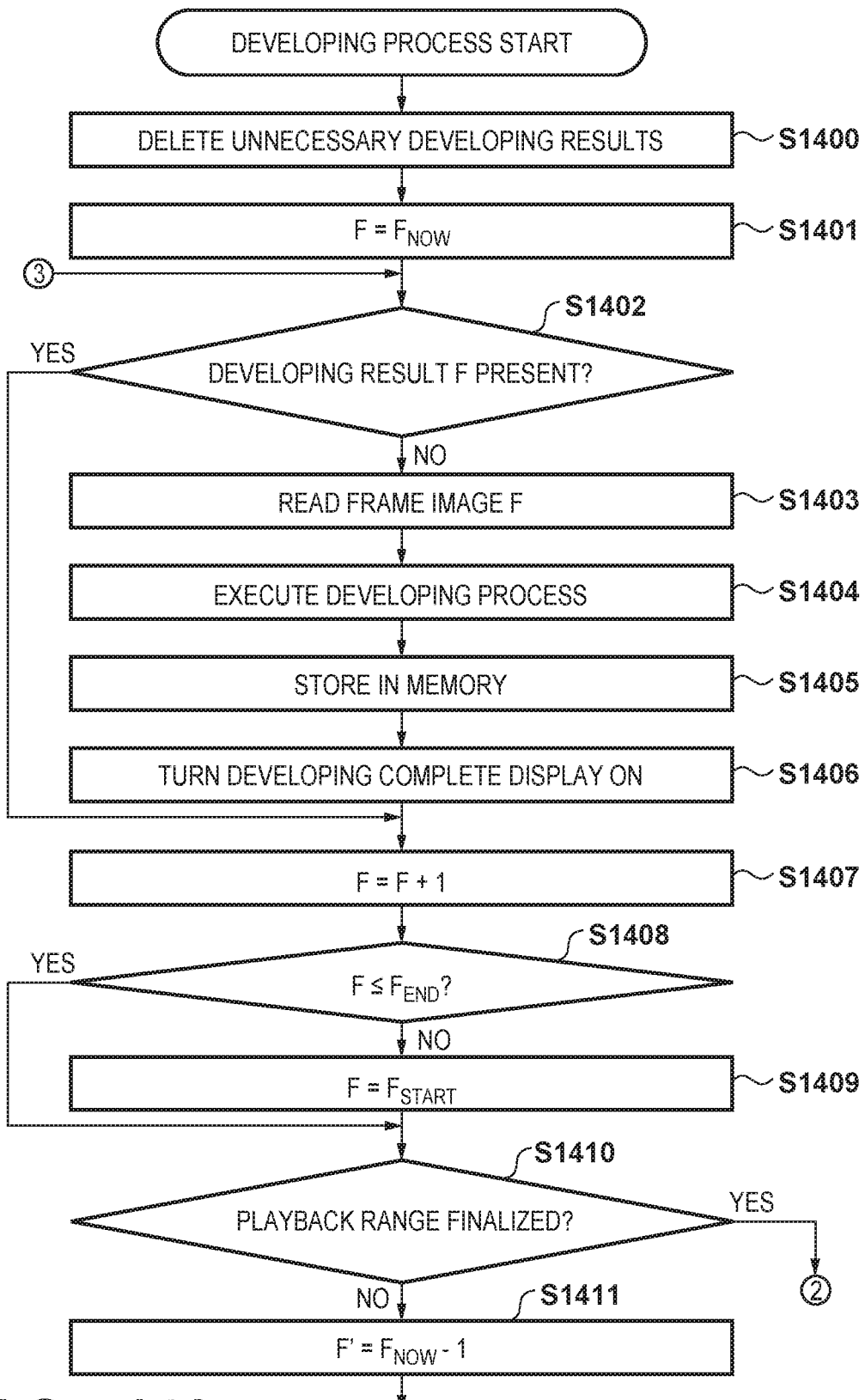
F I G. 14A

FIG. 18

THERE IS INSUFFICIENT MEMORY TO PROCESS THE SPECIFIED RANGE
AT THE CURRENT IMAGE QUALITY SETTINGS.
WOULD YOU LIKE TO CHANGE THE SETTINGS TO ALLOCATE
THE REQUIRED AMOUNT OF MEMORY?

CURRENT SETTINGS: HIGH IMAGE QUALITY/1.5 GB

MEMORY THAT CAN BE SECURED: 1.6 GB

REQUIRED MEMORY:  SELECT... ▼
High IMAGE QUALITY/1.8GB
Middle IMAGE QUALITY/0.9GB
Low IMAGE QUALITY/0.4GB

[CHANGE SETTINGS] [CHANGE ONLY THIS CLIP] [NO]

INFORMATION PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an information processing apparatus, a control method thereof and a non-transitory computer-readable storage medium.

Description of the Related Art in recent years, resolutions and framerates have been increasing for moving image data used in video creation, and the amount of data also continues to rise. A high-performance playback apparatus (and the processor thereof in particular) is required to smoothly play back such moving images having large amounts of data while carrying out image processing such as decoding and demosaicing for each frame. In other words, an apparatus lacking such processing capabilities will have a difficult time playing back videos smoothly.

Running high-load image processing in the background before starting playback and temporarily storing the processing results can be given as one way to address this issue. By doing so, it is sufficient to simply read out and display the processing results after playback is started, which makes it possible to play the video back smoothly. However, if playback is instructed to start before the processing results for all of the frames are stored, some of the frames will need to be processed anew before being displayed, which causes a sudden and dramatic drop in the display speed and results in a sense of unnaturalness for the user. To avoid this, it is conceivable to show the progress of the processing before playback in order to prompt the user to stand by until the processing has ended for his/her desired range.

However, if the memory has limited space for storing the results, it will not be possible to store the processing results for all of the frames in the moving image, regardless of how long the user stands by. The user not be able to know whether or not the desired range can be played back smoothly until the stored processing results reach the memory's space limit. In particular, when the data size of the processing result varies depending on the image processing parameters and so on, the number of frames for which the processing results can be saved will also vary depending on the parameters.

A recording apparatus typically calculates and displays the number of still images, the length of time of moving images, and the like that can be recorded on the basis of the remaining space in the media. For example, Japanese Patent Laid-Open No. 2007-110221 proposes a technique in which the length of moving images which can be shot is calculated on the basis of the space remaining in the storage media, and if the length is less than or equal to a defined value, image processing parameters are automatically changed so that longer moving images can be recorded, or an image quality setting screen is displayed to prompt the user to reconfigure the parameters.

Likewise, in a playback apparatus, the number of frames for which processing results can be stored can be calculated on the basis of the space remaining in the memory. However, if the moving image the user is attempting to play back is sufficiently short and only a small number of frames constitute the moving image, it is not always necessary to change the parameters in order to reduce the data amount. The overall length of the moving image is already known and thus a more visual display is possible.

SUMMARY OF THE INVENTION

The present invention makes it possible to improve usability by saving images obtained from a developing process into memory and clearly showing a range that can be played back smoothly to a user.

According to an aspect of the invention, there is provided an information processing apparatus configured to carry out a playback process on a RAW moving-image, the apparatus comprising: an image processing unit configured to for generate a processed moving image by carrying out image processing, including a developing process, on the RAW moving-image; a memory configured to store the processed moving image generated by the image processing unit; and a display control unit configured to carry out control so that a bar corresponding to the length of a time axis of the RAW moving-image is displayed in a display unit, wherein the display control unit is configured to display a processable range, which is a range for which, of the RAW moving-image, the moving image subject to the image processing by the image processing unit can be stored in the memory, along with the bar, before the image processing on the RAW moving-image in that processable range ends.

According to the present invention, it is possible to save images obtained from a developing process into memory and clearly show a range that can be played back smoothly to a user, which in turn makes it possible to for the user to confirm, in advance, whether it is possible to smoothly play back the range he or she wishes to play back.

Further features of the present invention will become apparent from the following description of exemplary embodiments (with reference to the attached drawings).

BRIEF DESCRIPTION OF THE DRAWINGS

FIG. 11 is a flowchart illustrating a RAW moving-image playback processing sequence according to an embodiment.

FIGS. 13A and 13B are diagrams illustrating examples of notification screens generated by the required memory amount notification process according to the second embodiment.

FIGS. 14A and 14B are flowcharts illustrating a developing processing sequence according to the second embodiment.

FIG. 18 is a diagram illustrating an example of a notification screen generated by the required memory amount notification process according to the third embodiment.

DESCRIPTION OF THE EMBODIMENTS

Figure 1:
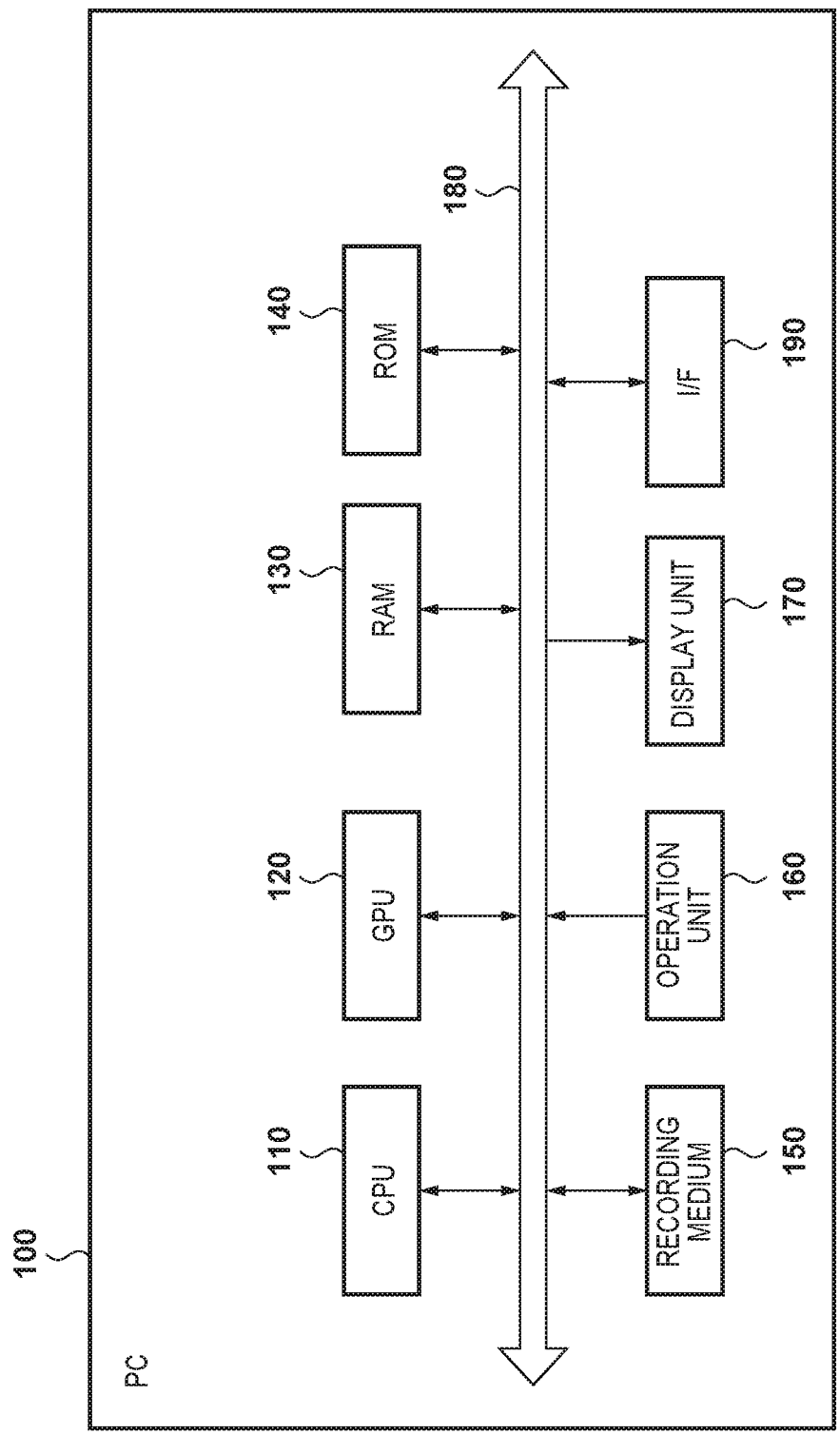
FIG. 1 is a block diagram illustrating an information processing apparatus according to an embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

The invention is not limited to the foregoing embodiments, and various variations/changes are possible within the spirit of the invention.

First Embodiment

An information processing apparatus to which the present embodiment is applied will be described as being a personal computer (PC) including a Central Processing Unit (CPU) and a Graphics Processing Unit (GPU). The PC according to the present embodiment has a developing function for generating displayable image data by carrying out a decoding process and a developing process on frame images constituting input RAW moving-image data and storing the generated data in memory before starting playback, and a playback function for reading out the developing results and displaying them in sequence at predetermined intervals of time after playback is started. The present embodiment will describe, as an example, a PC that displays a developable range and a developed range which vary depending on the configuration of image quality parameters.

FIG. 1 is a block diagram illustrating a PC 100 to which the present embodiment is applied. The PC 100 includes a CPU 110, a GPU 120, RAM 130, ROM 140, a recording medium 150, an operation unit 160, a display unit 170, an interface (I/F) 190, and a bus 180 that connects these elements to each other.

The CPU 110 controls the PC 100 as a whole, and can also carry out image processing by executing image processing commands it generated itself. The GPU 120 carries out image processing by executing image processing commands generated by the CPU 110. The GPU 120 includes Video Random Access Memory (VRAM), and the GPU 120 can exchange data between the CPU 110 and the VRAM using data transfer commands. The RAM 130 is memory which temporarily stores programs, data, and the like supplied from the exterior, and is used as a temporary storage region for data output as programs are executed. The ROM 140 is non-volatile memory which stores a Basic Input/Output System (BIOS), a boot program, various types of parameters, and the like. The ROM 140 is flash ROM, for example, and is configured so that control programs can be rewritten.

The recording medium 150 is a recording medium to and from which the PC 100 can write and read. This means that the cording medium 150 is, for example, an internal memory built into the computer, a removable memory card connected to the computer, or a medium onto which electronic data can be recorded, such as an HDD, a CD-ROM, an MO disk, an optical disk, a magneto-optical disk, or the like. Digital data such as moving image data is stored in the recording medium 150 as files.

The operation unit 160 is constituted by a keyboard, a pointing device such as a mouse, and so on. A user can enter various types of instructions to the PC 100 by making operations using this operation unit 160.

The display unit 170 is a display unit incorporated into the PC 100, such as a liquid crystal display, and displays a Graphical User Interface (GUI) screen of an application 200, image processing results, and so on, for example.

The interface (I/F) 190 is an interface for communicating with an external apparatus, and is a network interface, a USB interface, or the like. This embodiment assumes that RAW moving-image data input from an external apparatus (a video camera or the like) is stored in the recording medium 150 through the interface 190.

The bus 180 is a transmission path for control signals, data signals, and the like among the aforementioned elements in the PC 100.

In the configuration described thus far, when the PC 100 is turned on, the CPU 110 executes the boot program stored in the ROM 140, loads an Operating System (OS) into the RAM 130 from the recording medium 150, and runs the OS. Then, under the control of the OS, the CPU 110 loads the application program 200, which is involved in the playback of RAW moving-images (described later), into the RAM 130 from the recording medium 150 and executes the program. As a result, the PC 100 functions as a RAW moving-image playback apparatus.

Figure 2:
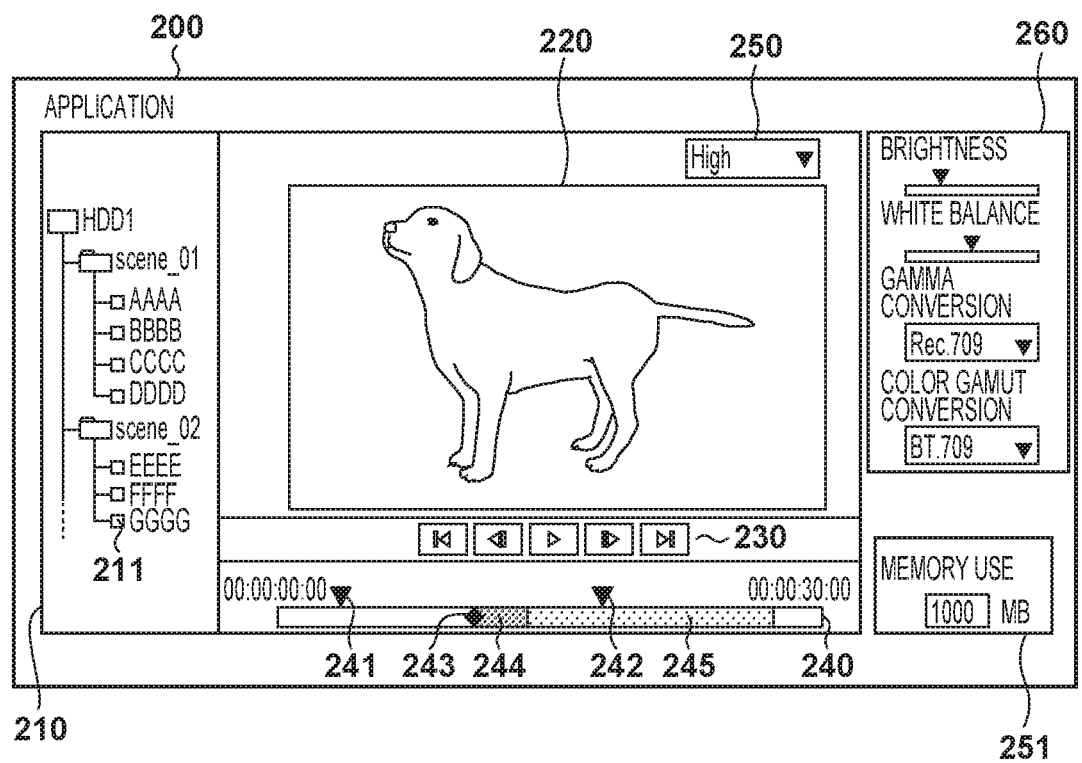
FIG. 2 is a diagram illustrating an example of a GUI according to an embodiment.

FIG. 2 illustrates an example of a graphical user interface (GUI) displayed in the display unit 170 when the CPU 110 is executing the application 200.

In the GUI illustrated in FIG. 2, reference sign 210 indicates a moving image data list display area that displays a list of moving image data read from the recording medium 150. Reference sign 211 indicates a single moving image data icon within the display area 210, and by moving a cursor to the icon 211 using the mouse of the operation unit 160 and clicking with the mouse, the user can select input moving image data to be subjected to image processing. Note that this user operation will be referred to simply as the user "clicking" the icon 211, for the sake of simplicity.

Reference sign 220 indicates a preview area where the result of the image processing carried out on the input moving image data selected by the user is played back and displayed. Reference sign 230 is a playing control portion for the user to control playback. The user can instruct image processing through a moving image playback function to be started and stopped by clicking a play/stop button in the playing control portion 230. Note that the play/stop button has a function for instructing the playback to be paused, during a state where a moving image is being played back, and instructing the playback to start, during a state where a moving image is not being played back. In addition to the play/stop button, the playing control portion 230 has frame advance buttons for moving the playback position one frame forward or backward, jump buttons for moving to the starting and ending positions of the moving image playback, and so on.

Reference sign 240 is a seek bar portion indicating the current playback position and so on, on a time axis of the input moving image data. A timer value of "00:00:00:00" (corresponding to hours, minutes, seconds, and ¹⁄₁₀₀ seconds) for indicating the start of the moving image is displayed at the left end of the seek bar portion 240, whereas a timer value of "00:00:30:00" for indicating the end of the selected moving image is displayed at the right end of the seek bar portion 240. From this display, the user can see that the file indicated by the icon 211 is a RAW moving-image file in which the moving image is 30 seconds long. Note that rather than displaying the time, a frame number "1" may be displayed at the left end of the seek bar portion 240, and the number of the final frame (the total number of frames) may be displayed at the right end of the seek bar portion 240.

Reference signs 241 and 242 are icons functioning as playback range setting portions for the moving image in the input moving image data, with a playback start position icon 241 used to indicate the start of the playback range and a playback end position icon 242 used to indicate the end of the playback range. The positions of these icons can be changed by the user dragging and dropping the icons.

Reference sign 243 indicates an icon functioning as a current playback position setting portion for the input moving image data. The result of image processing carried out on the frame indicated by the playback position icon 243 is displayed in the preview area 220. The position of the playback position icon 243 can be changed by being dragged and dropped by the user, or by clicking the frame advance buttons or jump buttons in the playing control portion 230. When the user clicks the play button in the playing control portion 230, the input moving image data is played back starting from the frame indicated by the playback position icon 243. If the user has newly selected a RAW moving-image file, the playback start position icon 241 and the playback position icon 243 are located at the left end of the seek bar portion 240, as a default position. Meanwhile, it is assumed that the playback end position icon 242 is located at the right end of the seek bar portion 240 as a default position.

Reference sign 244 indicates the range in the input moving image data for which the developing result has been generated (the developed range), and reference sign 245 indicates a range in the input moving image data for which developing as possible (the developable range). These will be described in greater detail later.

Reference sign 250 indicates an image quality setting portion through which the user selects image quality parameters for specifying an image quality level of the image processing. Image processing is executed according to the details of the image quality parameters selected by the user using the image quality setting portion 250. In the present embodiment, the image quality parameters can be selected from among "high", "middle", or "low". In this embodiment, the image quality parameters are assumed to indicate the resolution. For example, displaying a single frame in the RAW moving-image file without thinning out the pixels corresponds to "high", thinning the pixels out to ½ horizontally and vertically corresponds to "middle", and thinning the pixels out to ¼ horizontally and vertically corresponds to "low". Note that the differences in the image quality may instead be expressed as a number of bits per pixel, or the image quality may be defined by a combination of the resolution and the number of bits.

Reference sign 251 is a memory amount setting portion for the user to set a buffer memory amount to be used to store the developing results (the image data already subjected to the developing process). The upper limit on the value that can be set corresponds to the space in the RAM 130 that can be allocated to the application 200 in an environment where the application 200 is running. Note that when a memory amount has been set in the memory amount setting portion 251 (i.e., when the user has changed the value), that value may be registered in the OS registry and read out to the memory amount setting portion 251 the next time the application 200 is launched.

Reference sign 260 is a general parameter setting portion for carrying out image processing pertaining to the tint of the moving image being played back, and in the present embodiment, "brightness" and "white balance" can be adjusted using slider bars, and "gamma conversion" and "color gamut conversion" can be switched using pull-down tabs. The application 200 has other operation portions for executing typical functions pertaining to moving image playback, but these are not illustrated here.

Figure 3:
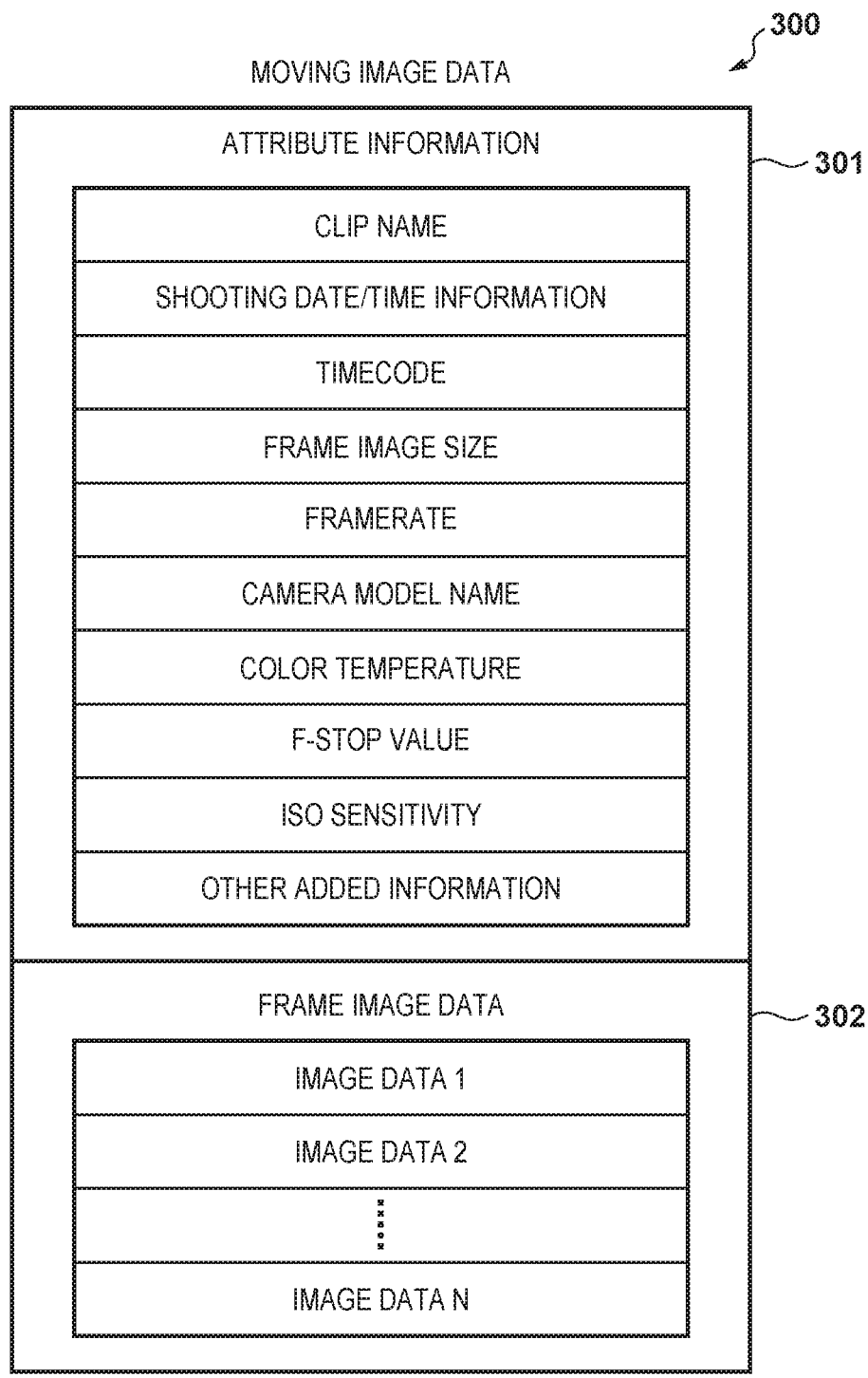
FIG. 3 is a diagram illustrating the structure of moving image data.

FIG. 3 is a conceptual diagram illustrating RAW moving-image data (file) 300 stored in the recording medium 150.

Reference sign 301 indicates a header portion, in which attribute information of the moving image is recorded. Specifically, this is added information including a clip name, shooting date/time information, a timecode, the image size of the frame images constituting the moving image (the resolution in the horizontal and vertical directions), the framerate, a camera model name, color temperature, f-stop value, ISO sensitivity, the starting address of encoded data for each frame, and the like.

Reference sign 302 indicates a frame image data portion (or "payload portion"), and the content of the frame images constituting the shot moving image is recorded in order from the images shot first. FIG. 3 illustrates a case where a total of N RAW frame images, i.e., image data 1, 2, and so on up to N, are stored in the RAW image data 300. The present embodiment assumes that the image data 1, 2, and so on illustrated in FIG. 3 is encoded data obtained by encoding the RAW image data (Bayer array image data), and that previewable image data, in which a single pixel is expressed by RGB, is generated by carrying out a developing process on each frame after decoding the frames.

Operations carried out when playing back a moving image according to the present embodiment will be described next with reference to FIGS. 4 to 10C. The present embodiment assumes that the application program 200 for playing back a moving image is initially stored in the recording medium 150, and is then loaded into the RAM 130 from the recording medium 150 and executed under the control of the OS. Note, however, that the application program 200 may be stored in the ROM 140. Likewise, the program may be stored in the server on a network, and then downloaded into the RAM 130 through the interface 190 and executed.

Figure 4:
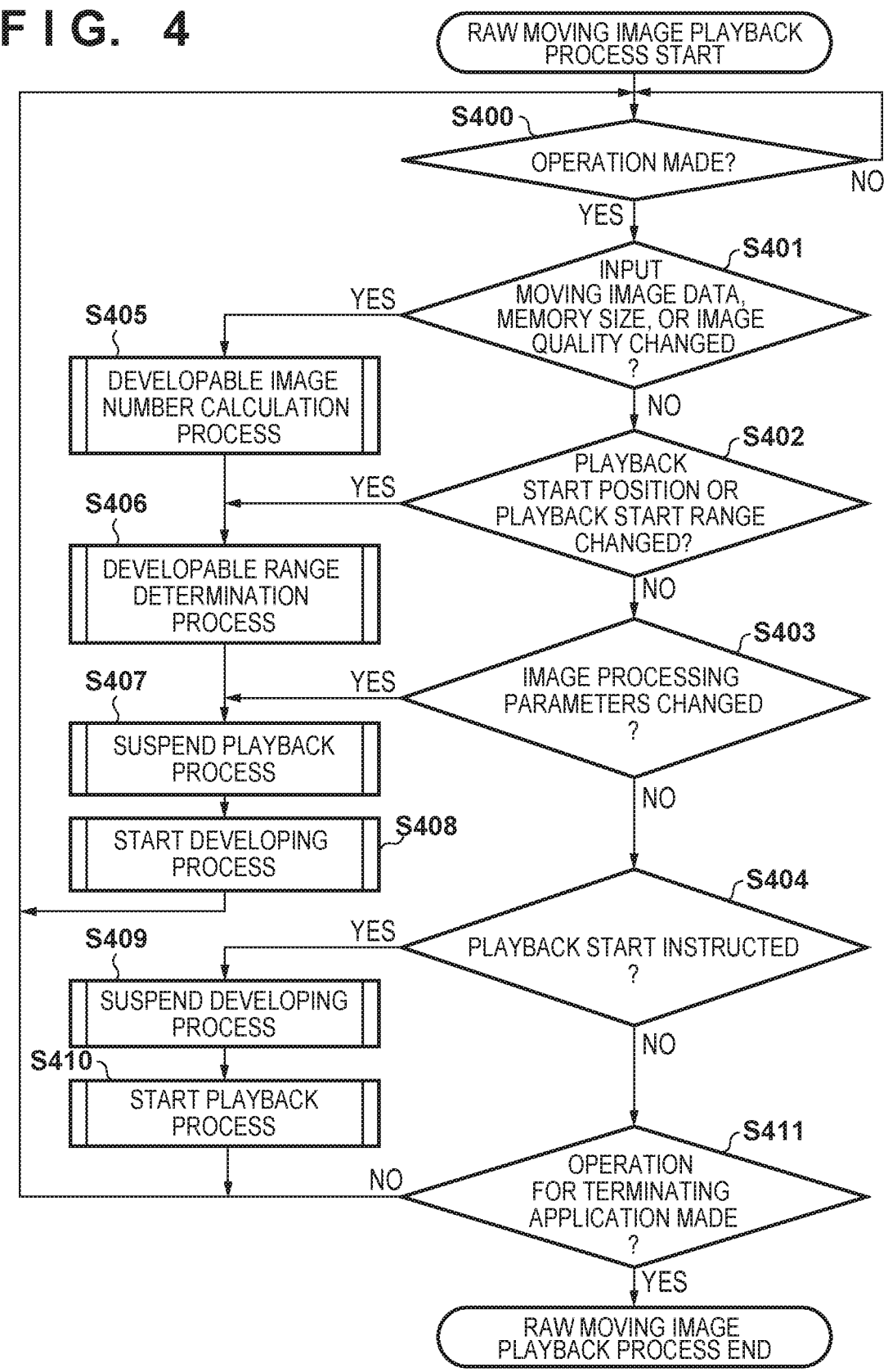
FIG. 4 is a flowchart illustrating a RAW moving-image playback processing sequence according to a first embodiment.

FIG. 4 is a flowchart illustrating a sequence of operations carried out by the application program 200 on the RAW moving-image data 300 illustrated in FIG. 3 when playing back a RAW moving-image. Note that the application program 200 may have a typical moving image playback function for moving image files in a typical format different from the RAW moving-image data 300. Only the process for playing back the RAW moving-image will be described here.

In step S400, the CPU 110 stands by for an operation from the user, and determines whether or not an operation has been made. If it is determined that the user has made an operation, the CPU 110 advances the process to step S401, whereas if it is determined that no operation has been made, the CPU 110 returns the process to step S400 and stands by for an operation.

In step S401, the CPU 110 determines whether the user has changed the RAW image data to be played back, whether the user has changed the memory amount by manipulating the memory amount setting portion 251, and whether the user has changed the image quality parameters by manipulating the image quality setting portion 250. If it is determined that any of these changes have been made, the CPU 110 advances the process to step S405, whereas if it is determined that none of these changes have been made, the CPU 110 advances the process to step S402. The present embodiment assumes that the playback position immediately after the input moving image data has been changed is the first frame. Note that the configuration may be such that the playback position last set by the user is stored for each piece of moving image data, and that position is used the next time the data is selected.

In step S402, the CPU 110 determines whether the user has changed the playback position icon 243, whether the playback start position icon 241 or the playback end position icon 242 has been changed, or whether the playback has been instructed to be paused by the play/stop button being pressed. If it is determined that any of these changes have been made, the CPU 110 advances the process to step S406, whereas if it is determined that none of these changes have been made, the CPU 110 advances the process to step S403.

In step S403, the CPU 110 determines whether image processing parameters have been changed by the user manipulating the parameter setting portion 260. If it is determined that the image processing parameters have been changed by the user, the CPU 110 advances the process to step S407, whereas if it is determined that the image processing parameters have not been changed, the CPU 110 advances the process to step S404.

In step S404, the CPU 110 determines whether or not the user has instructed playback to start by pressing the play/stop button. If it is determined that the user has instructed playback to start, the CPU 110 advances the process to step S409, whereas if it is determined that no such instruction has been made, the CPU 110 advances the process to step S411.

In step S405, the CPU 110 carries out a developable image number calculation process (described in detail later). In step S406, the CPU 110 carries out a developable range determination process (described in detail later). In step S407, the CPU 110 suspends the playback process started in step S410. In step S408, the CPU 110 starts the developing process and then returns the process to step S400 (described in detail later).

In step S409, the CPU 110 suspends the developing process started in step S408. In step S410, the CPU 110 starts the playback process and then returns the process to step S400 (described in detail later).

In step S411, the CPU 110 determines whether or not the user has made an operation to terminate the application. If it is determined that the user has made an operation to terminate the application, the CPU 110 ends the RAW moving-image playback process, whereas if it is determined that no operation to terminate the application has been made, the CPU 110 returns the process to step S400.

Note that the configuration may be such that the playing control portion 230 is grayed out and the determinations from steps S402 to S404 are consistently false until the input moving image data is first selected in step S401 after the RAW moving-image playback process has been started. Alternatively, of the moving image data displayed in the moving image data list display area 210, the moving image data first or last in order of the display position, clip name, shooting date/time, or the like, the moving image data subject to image processing the previous time, or the like may be selected in advance as the default input moving image data.

Figure 5:
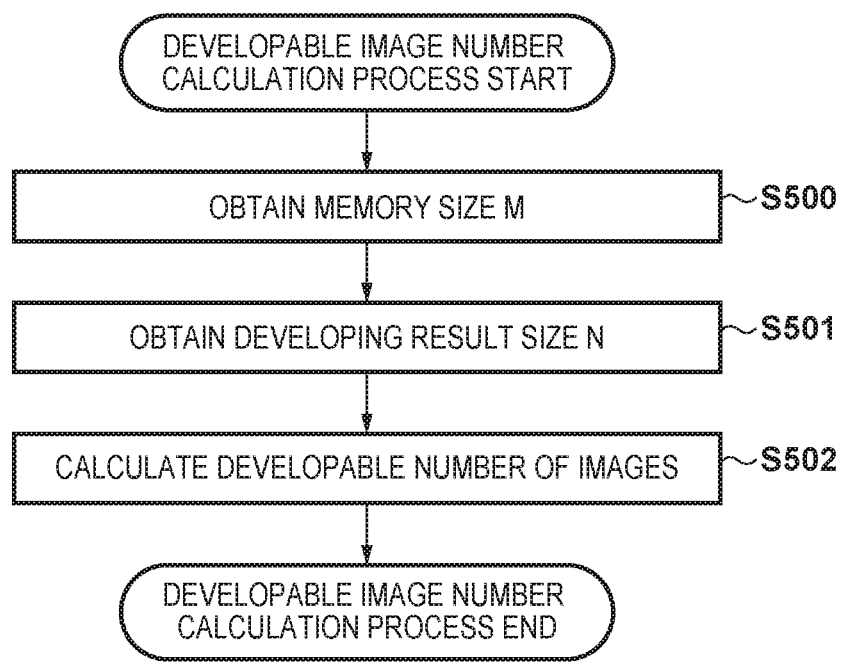
FIG. 5 is a flowchart illustrating a processing sequence for calculating a number of images that can be developed, according to an embodiment.

The process for calculating the number of developable images, carried out in step S405 FIG. 4, will be described next using the flowchart in FIG. 5. In the present embodiment, the number of developable images is calculated for all of the image quality parameters which can be set in the image quality setting portion 250.

In step S500, the CPU 110 obtains the size of a region in the RAM 130 which can be used to save the developing results (the value set in the memory amount setting portion 251). The size of the region for saving the developing results will be expressed hereinafter as M bytes, using the variable M.

In step S501, the CPU 110 obtains the size of the developing result per single frame image, for all of the image quality parameters which can be set through the image quality setting portion 250. The size of the developing result differs depending on the image quality parameters. The "image quality parameters" refer to at least one of resolution, bit depth, compression rate, reduction rate, and so on, for example. As described earlier, the present embodiment assumes that the "image quality parameters" refer to the reduction rate relative to the resolution of the original data, where "high" indicates 1×, "middle" indicates ½× in both the horizontal and vertical directions, and "low" indicates ¼× in both the horizontal and vertical directions. In other words, the size (number of pixels) of the developing result is greatest when the image quality parameters are set to "high", with "middle" being ¼ the size of "high", and "low" being the smallest at 1/16 the size of "high". The size of a single frame obtained by carrying out the developing process according to the "high", "middle", and "low" image quality parameters are expressed as $N_H$, $N_M$, and $N_L$ bytes, respectively.

In step S502, the CPU 110 calculates numbers of developable images $F_H$, $F_M$, and $F_L$ for each of the "high", "middle", and "low" image quality parameters, using the following equations. The number of developable images is the number of images in the developing results which can be saved in the region for saving the developing results provided in the RAM 130.

$$F_H = \text{FLOOR}(M/N_H)$$

$$F_M = \text{FLOOR}(M/N_M)$$

$$F_L = \text{FLOOR}(M/N_L)$$

Here, FLOOR(X) is a floor function that returns a maximum integer not exceeding a real number X.

Next, the developable range determination process carried out in S406 of FIG. 4 will be described using the flowchart in FIG. 6. Here, the frame number in the input moving image indicated by the playback position icon 243 is represented by $F_{Now}$, the frame number indicated by the playback start position icon 241 of the playback range is represented by $F_{START}$, and the frame number indicated by the playback end position icon 242 is represented by $F_{END}$.

In step S600, the CPU 110 finds the range of the frames for which the developing process is to be carried out, for each of the image quality parameters. In the present embodiment, the developing results are generated for the number of developable frames, in order starting from the playback position 243. In other words, assuming that the number of developable images for given image quality parameters is represented by $F_{CAN}$, the range for the developing process is found as $F_{NOW} \sim F_{NOW} + F_{CAN}$. However, if $F_{NOW} + F_{CAN} > F_{END}$, a number of frames corresponding to $(F_{NOW} + F_{CAN}) - F_{ND}$, which fall outside the playback range, is allocated to the frames following $F_{START}$. If $F_{CAN} \geq F_{START} - F_{END}$, all the frames in the playback range are within the developable range.

In step S601, the CPU 110 carries out a developable display on the basis of the developable range found in step S600, for each of the image quality parameters. The "developable display" is a process for displaying, in the seek bar portion 240, a part corresponding to the range of the input moving image data on which the developing process can be carried out, with that part being distinguishable from the other parts (with a different color, in this embodiment) and displayed in an emphasized manner. The developable display may be carried out for all the image quality parameters which can be set through the image quality setting portion 250, or only for some of the image quality parameters. The display method will be described in detail later.

The developing process carried out in step S408 of FIG. 4 will be described next using the flowchart in FIG. 7. The CPU 110 executes the developing process in units of frames based on the image quality parameters currently selected through the image quality setting portion 250, found through the developable range determination process, in order from the frame indicated by the playback position icon 243.

In step S700, the CPU 110 frees up memory by deleting unnecessary parts of the existing developing results saved in the RAM 130. If the input moving image data, image quality parameters, and image processing parameters have been changed after the existing developing results were generated, all of the existing developing results are deleted. If such is not the case, and the playback position, playback range, and memory size have been changed, the existing developing results which are saved in the RAM 130 and are included in the developable range found in step S600 FIG. 6 are left, while the other developing results are deleted. To delete the developing results, a process may be carried out for deleting the results from the RAM 130, or the frame data of the developing results may be discarded by carrying out a process for freeing up the region in the RAM 130 where the frame data of the developing results to be deleted is saved.

In step S701, the CPU 110 substitutes $F_{NOW}$ for the variable F.

In step S702, the CPU 110 determines whether or not the developing result generated for the Fth frame in the input moving image data is present in the developing result saving region of the RAM 130. If it is determined that the developing result for the Fth frame is present in the developing result saving region of the RAM 130, the CPU 110 moves the process to step S707, and if not, the CPU 110 advances the process to step S703. In other words, the developing processes in steps S703 and S704 are not carried out for frames located within the developable range found in step S600 of FIG. 6 and for which developing results remain in the RAM 130. However, the developing processes of steps S703 and on are executed for frames which are located within the developable range but for which developing results do not remain in the RAM 130.

In step S703, the CPU 110 reads the data of the Fth frame in the input moving image data. In step S704, the CPU 110 carries out the developing process on the frame which has been read. The developing process includes, for example, the following: a decoding process, when the frame image is a compressed image; when the frame image is a RAW image, processing for improving the image quality, such as demosaicing, noise removal, false color removal, and so on; correction processing such as ambient light amount correction and chromatic aberration correction; adjustment processes for adjusting the details of settings, such as brightness, white balance, gamma, and color gamut; resizing processes for resizing the preview area 220, which is an image display region; and so on. Although the developing process is executed by the CPU 110 or the GPU 120, the processing content, the image region, and so on may be divided and split between the CPU 110 and the GPU 120. Details of the algorithms for the developing process are not of direct concern to the present invention and will therefore not be described in particular. The result of the developing process is output as a developing result having a size corresponding to the image quality parameters selected through the image quality setting portion 250.

In step S705, the CPU 110 stores the developing result in the developing result saving region of the RAM 130. In step S706, the CPU 110 sets a developing complete display for the Fth frame in the input moving image data to "on". The display method will be described in detail later.

In step S707, the CPU 110 adds 1 to the variable F. Then, in step S708, the CPU 110 determines whether or not the variable F is less than or equal to $F_{END}$. If the variable F is less than or equal to $F_{END}$, the CPU 110 advances the process to step S710, and if not, the CPU 110 advances the process to step S709.

In step S709, the CPU 110 substitutes $F_{START}$ for the variable F. In step S710, the CPU 110 determines whether the developing process is complete for all the frames in the developable range found in step S600 of FIG. 6. If it is determined that the developing process is complete for all of the frames in the developable range, the CPU 110 ends the developing process. However, if it is determined that there is an undeveloped frame in the developable range, the CPU 110 returns the process to step S702.

The playback process carried out in step S410 of FIG. 4 will be described next using the flowchart in FIG. 8. The present embodiment will describe an example in which, when an attempt is made to play back a frame for which no developing result is present, the developing process and a preview display are carried out in order for a single frame; as a result, although the speed of the preview display will drop, the display will be carried out at what are substantially constant time intervals.

In step S800, the CPU 110 substitutes $F_{NOW}$ for the variable F. Then, in step S801, the CPU 110 determines whether or not the image data which has been obtained from the developing process carried out on the frame in the input moving image data indicated by the variable $F_{NOW}$ is present in the developing result saving region of the RAM 130. If it is determined that the image data for the frame indicated by the variable F is present in the developing result saving region of the RAM 130, the CPU 110 advances the process to step S802, and if not, the CPU 110 advances the process to step S803.

In step S802, the CPU 110 reads the image data, which is the result of the developing process carried out on the frame in the input moving image data indicated by the variable F, from the developing result saving region of the RAM 130.

In step S803, the CPU 110 reads the data of the flame indicated by the variable F from the input moving image data. Then, in step S804, the CPU 110 carries out the developing process on the data of the frame which has been read. The developing process is the same such as that carried out in step S704 of FIG. 7, and will therefore not be described here.

In step S805, the CPU 110 displays the image data of the developing result read in step S802, or the image data obtained from the developing result generated in step S804, in the preview area 220.

In step S806, the CPU 110 adds 1 to the variable F. Then, in step S807, the CPU 110 determines whether or not the variable F is less than or equal to $F_{END}$. If it is determined that the variable F is less than or equal to $F_{END}$, the CPU 110 returns the process to step S801, and if not, the CPU 110 ends the playback process.

Figure 6:
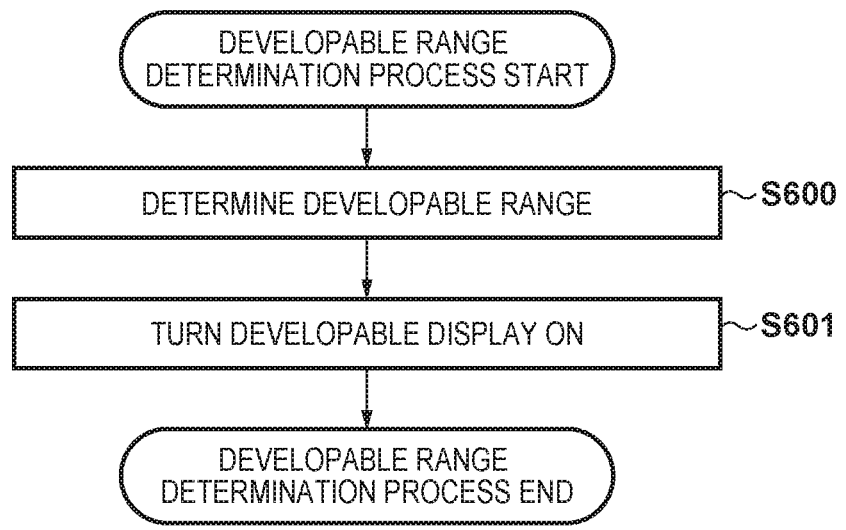
FIG. 6 is a flowchart illustrating a processing sequence for determining a range that can be developed, according to an embodiment.
Figure 7:
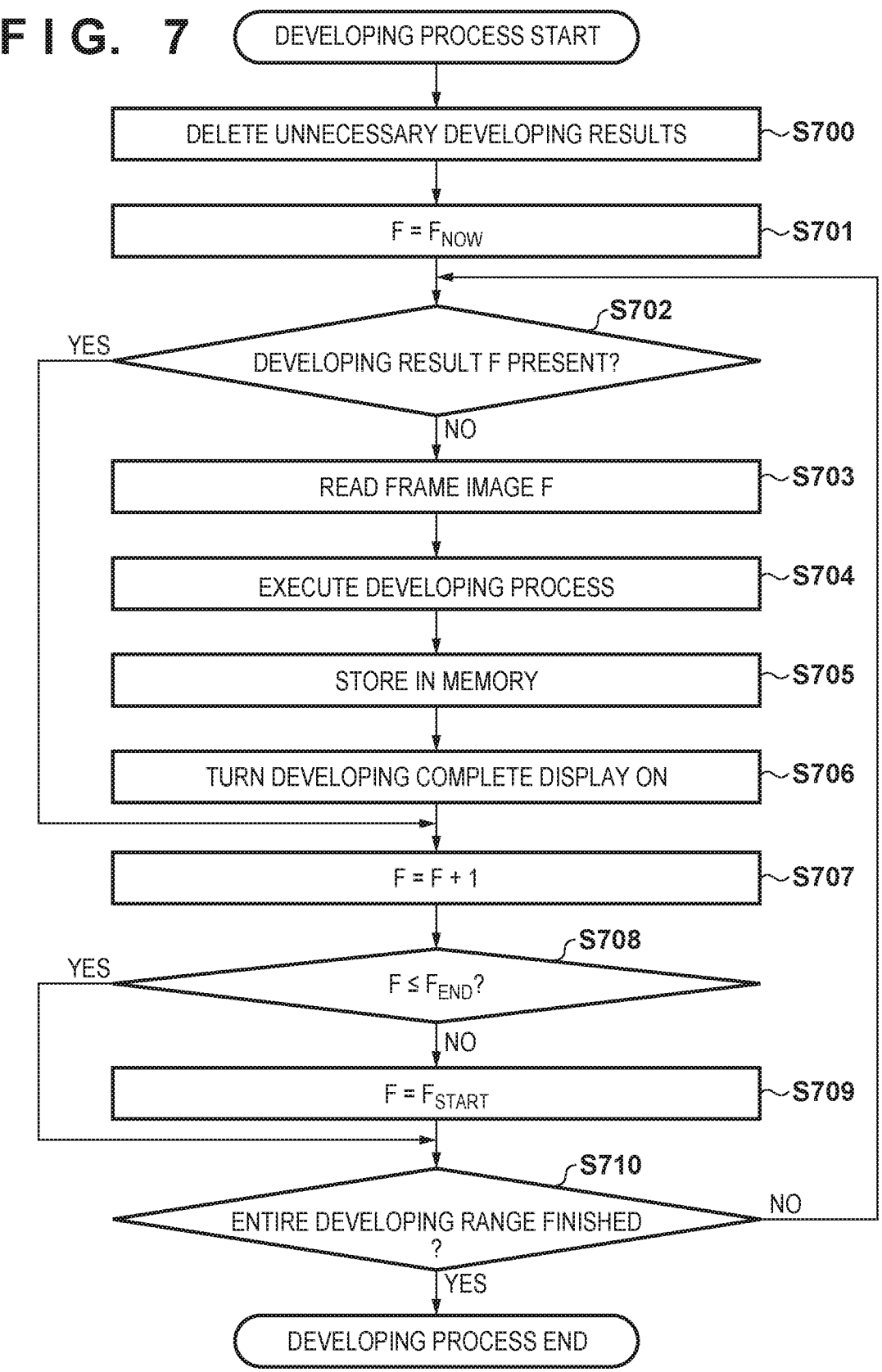
FIG. 7 is a flowchart illustrating a developing processing sequence according to an embodiment.
Figure 9A:
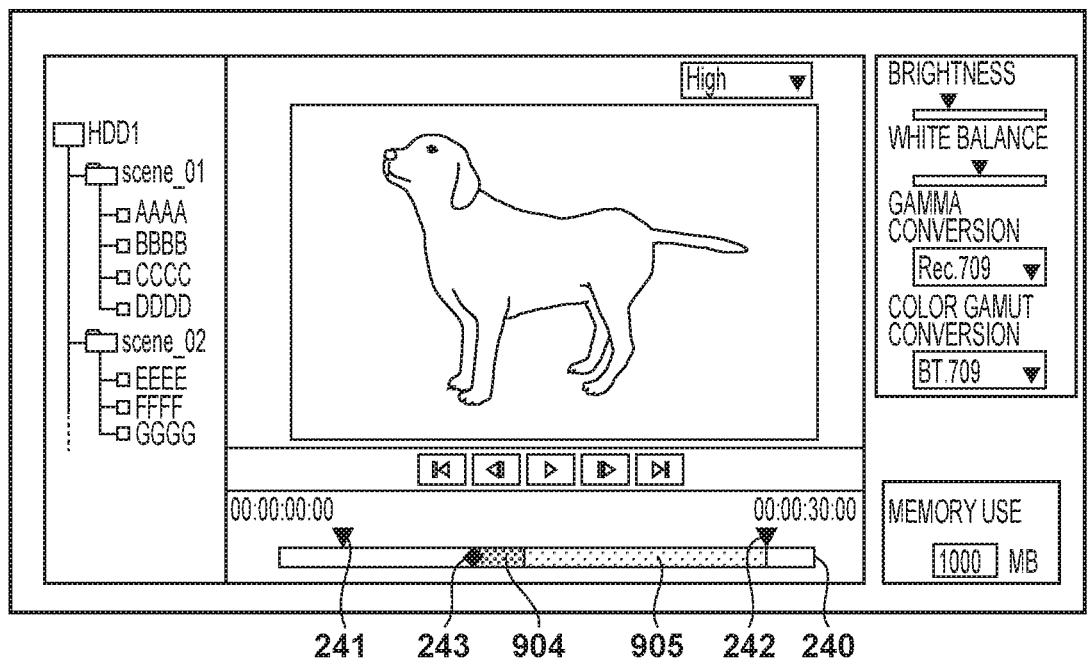
FIGS. 9A to 9C are diagrams illustrating a GUI according to an embodiment.
Figure 9B:
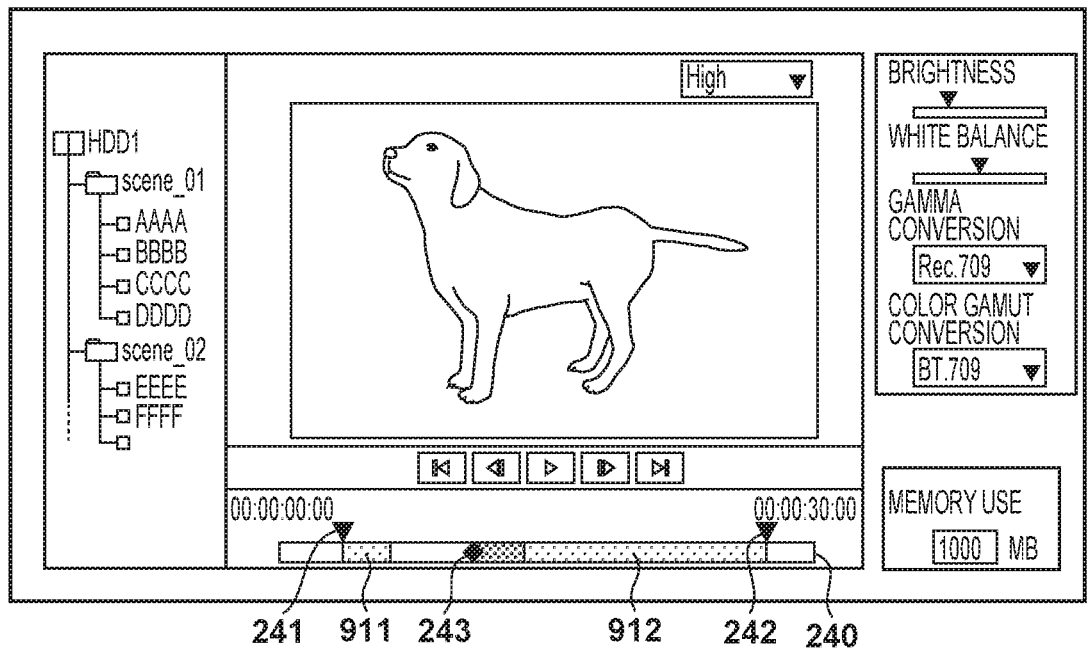
Figure 9C:
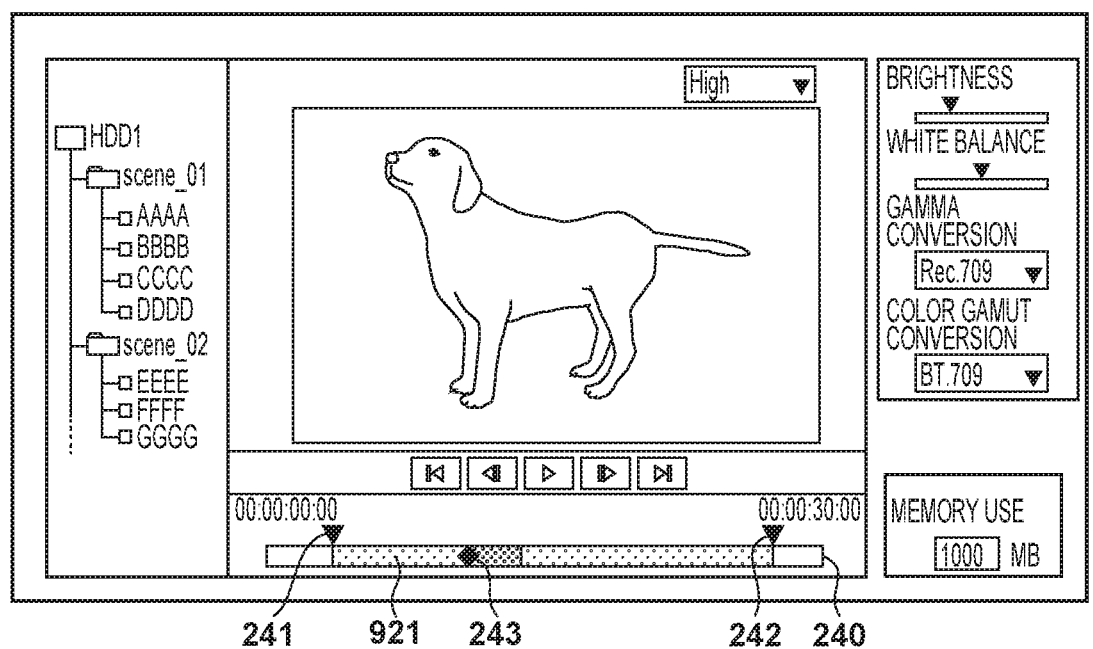

FIGS. 9A to 9C are diagrams illustrating details of the display configuration of the GUI in FIG. 2, for a case where the developable display in step S601 of FIG. 6 and the developing complete display in step S706 of FIG. 7 have been carried out for only the image quality parameters currently selected through the image quality setting portion 250.

FIG. 9A is a display example for a situation where $F_{NOW}+F_{CAN} \leq F_{END}$. In the seek bar portion 240, a region 905 ($F_{NOW} \sim F_{NOW}+F_{CAN}$) corresponding to the developable range is displayed in light gray, and a region 904 corresponding to the developed range is displayed in dark gray.

FIG. 9C is a display example for a situation where $F_{CAN} \geq F_{END} - F_{START}$. A part 921 corresponding to the developable range, i.e., the entire playback range, is displayed in the seek bar portion 240 in light gray.

FIG. 9B is a display example for other situations. In the seek bar portion 240, a part 911 ($F_{START} \sim F_{START}+(F_{NOW}+F_{CAN})-F_{END}$) corresponding to the developable range, and a part 912 ($F_{NOW} \sim F_{END}$), are displayed in light gray.

During the playback process of step S410 in FIG. 4, a preview for the frames for which developing results are present, i.e., which are located within the developed range (dark gray), can be displayed immediately after the frames are read, and can therefore be played back smoothly. On the other hand, the developing process of step S804 in FIG. 8 takes time for the frames for which the developing results are not present, i.e., in the ranges indicated by a color aside from dark gray, which causes delay in the display and leads to a major drop in the playback quality. As the developing process in step S408 of FIG. 4 progresses, the parts indicated by light gray are progressively replaced with dark gray, and once those parts are completely replaced, the display stops changing. In other words, the display of the seek bar portion indicates that only the range indicated by dark gray can be played back at a high playback quality at the point in time when the playback process starts, and that the range indicated by light gray can be played back at a high playback quality after standing by for a certain amount of time.

Although the foregoing describes the regions of the developable display and the developing complete display as being expressed with colors (light and dark gray), these regions may be expressed through a different method. Also, the configuration may be such that the user can switch between showing and hiding the developable display. For example, a check box GUI for switching between showing and hiding the developable display, a function for only showing the developable display when a specific key is being pressed on the keyboard, or the like may be provided.

Figure 10A:
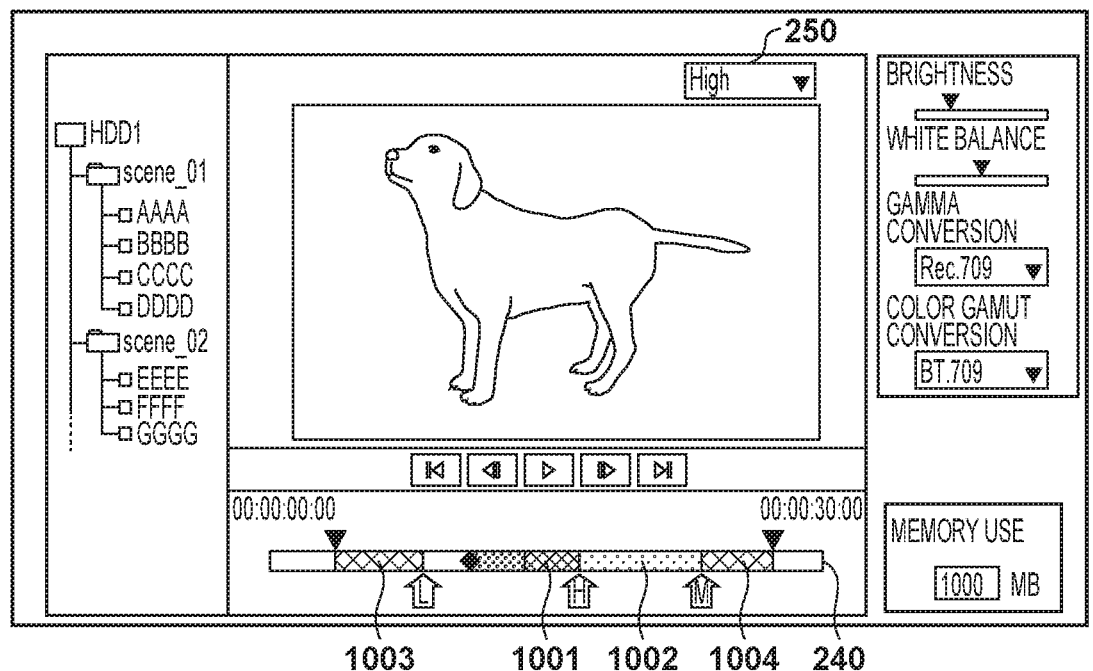
FIGS. 10A to 10C are diagrams illustrating a GUI according to an embodiment.
Figure 10B:
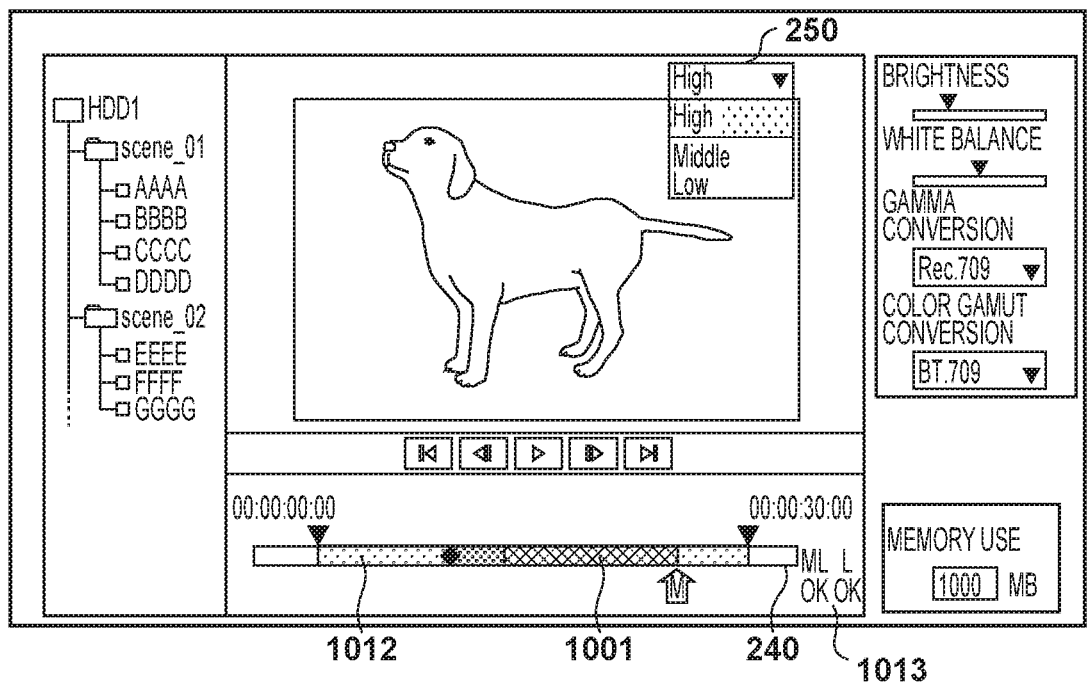
Figure 10C:
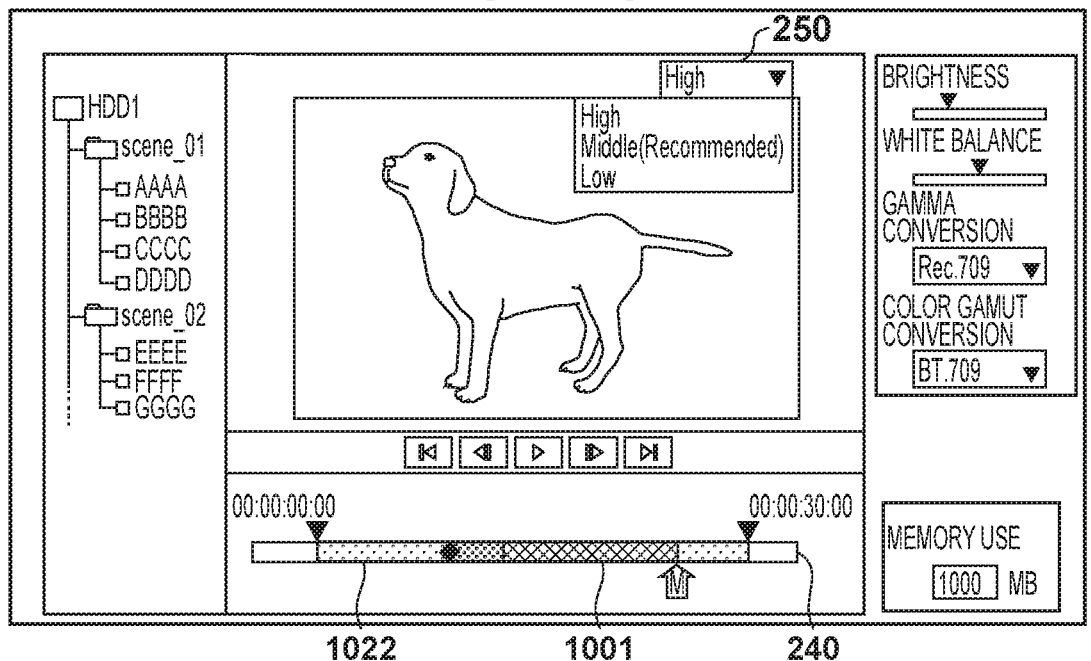

FIGS. 10A to 10C are diagrams illustrating details of the display configuration of the GUI in FIG. 2, for a case where the developable display in step S601 of FIG. 6 and the developing complete display in step S706 of FIG. 7 have been carried out for all of the image quality parameters that can be set through the image quality setting portion 250.

FIG. 10A is a display example for a situation where all of the frames in the playback range are not in the developable range for any of the image quality parameters. In the seek bar portion 240, a developable range 1001 for when the image quality parameters are "high", a developable range 1002 for when the image quality parameters are "middle", and developable ranges 1003 and 1004 for when the image quality parameters are "low" are displayed with different colors, and icons indicating the details of the image quality parameters corresponding to the respective end point positions are added as well. The icon for the image quality parameters currently selected through the image quality setting portion 250 is displayed with a different color so as to be distinguishable from the other icons.

FIGS. 10B and 10C are display examples for situations where all the frames in the playback range can be played back with the image quality parameters of "middle" and "low". Developable ranges 1012 and 1022 for the image quality parameters "middle" and "low" are displayed with the same color in the seek bar portion 240. Furthermore, displaying which image quality parameters enable all frames in the playback range to be developed makes it possible to assist the user in selecting the image quality parameters. For example, FIG. 10B illustrates an example in which when the drop-down list of the image quality setting portion 250, which is an image quality settings menu, is expanded, the row containing the image quality parameters at which all of the frames in the playback range can be played back is displayed with emphasis by using a different color from the other rows. FIG. 10C, meanwhile, illustrates an example in which when the drop-down list of the image quality setting portion 250 is expanded, only the row containing the highest image quality parameters at which all of the frames in the playback range can be played back is displayed with emphasis by adding a character string ("recommended") indicating that those parameters are recommended. The recommended parameters are preferably image quality parameters, at which all the frames in the playback range can be played back, which have the highest image quality. Alternatively, the highest parameters among the image quality parameters at which all of the input moving image data can be played back may be taken as the recommended parameters.

The developable display for each of the image quality parameters may be realized through a method aside from changing the display color of the seek bar portion. For example, a configuration is possible in which only the endpoint is indicated by an icon, or in which a different GUI is provided in displayed above or below the seek bar portion. Alternatively, the configuration may be such that only whether or not the entire playback range can be developed is displayed near the seek bar portion for each of the image quality parameters, as indicated by reference sign 1013 in FIG. 10B. Furthermore, the configuration may be such that whether the entirety of the input moving image data can be developed is displayed, instead of only the playback range. Whether the entire playback range can be developed may be displayed if the playback range is set, whereas whether the entire input image can be developed may be displayed if the playback range is not set. Additionally, the user may be notified of the recommended image quality parameters at which all of the frames in the input moving image data can be played back by displaying the recommended parameters at the right end of the seek bar portion, which corresponds to the end part of the moving image data. Alternatively, the recommended image quality parameters may be displayed as a pop-up when the mouse hovers over a specific part of the seek bar portion, such as the right end.

Additionally, the configuration may be such that of the image quality parameters not currently selected through the image quality setting portion 250, the developable display is made for only some of the parameters. For example, a configuration is possible in which only the image quality parameters one level above or below the image quality parameters currently selected through the image quality setting portion 250 are displayed, or in which only the highest image quality parameters at which all of the frames in the playback range can be played back are displayed.

Additionally, a configuration may be employed in which the developable display is carried out only during or immediately after the user has made a predetermined operation, with respect to the image quality parameters not currently selected through the image quality setting portion 250. For example, a function may be provided in which the developable display is carried out only during, or for 5 seconds immediately after, the operation of the image quality setting portion 250, the seek bar portion 240, or the like.

Thus according to the present embodiment, developing results are generated and saved for a number of images in an input moving image file which can be saved in memory before the start of playback, and the readout and display of the developing results are carried out only at the time of playback, which makes it possible to improve the playback quality for the range for which the developing results have already been generated. Additionally, displaying the ranges for which the developing results have already been generated and can be generated makes it possible to present, to the user, the range which can be played back at a high playback quality at the present point in time, and the range which can be played back at a high playback quality after standing by. Furthermore, displaying the ranges for which the developing results can be generated for each of the image quality parameters makes it possible to present, to the user, which image quality parameters should be selected to enable the desired playback range to be played back with a high playback quality. This eliminates the need for the user to repeatedly change the image quality parameters and confirm the playback range, and makes it possible to carry out the intended playback having changed the image quality parameters only once.

Second Embodiment

The foregoing first embodiment described an example of a PC that calculates and displays the developed range and the developable range for each of the image quality parameters. The present embodiment will describe an example of a PC in which whether a specified playback range can be developed is communicated to the user on the basis of the amount of memory that can be used, and the user can then select whether or not to change the memory amount. Additionally, the first embodiment describes an example of a PC that develops the frames which come after the playback position in order. However, the present second embodiment will also describe an example in which the range and order of the frames to be developed is changed in response to the state of user operations.

In the present second embodiment, the block diagram illustrating the configuration of the PC, the diagram illustrating the configuration of the GUI of the application 200, and the conceptual diagram illustrating the RAW moving-image data stored in the recording medium 150 are all the same as FIGS. 1 to 3 described with reference to the first embodiment, and will therefore not be described here.

Moving image playback operations according to the present second embodiment will be described hereinafter with reference to FIGS. 11 to 16.

FIG. 11 is a flowchart illustrating a processing sequence carried out by the application 200 on the RAW moving-image data 300 illustrated in FIG. 3 when playing back a RAW moving-image.

Steps S1100 and S1101 can be carried out through the same processing as in steps S400 and S401 in FIG. 4, and will therefore not be described here.

In step S1102, the CPU 110 determines whether the user has changed the playback position icon 243, whether the playback range (the position of the playback start position icon 241 or the playback end position icon 242) has been changed, or whether the playback has been instructed to be paused by the play/stop button being pressed. If it is determined that one of these operations has been made, the CPU 110 advances the process to step S1105, whereas if it is determined that none of these operations have been made, the CPU 110 advances the process to step S1103.

Steps S1103 and S1104 can be carried out through the same processing as in steps S403 and S404 in FIG. 4, and will therefore not be described here.

In step S1105, the CPU 110 carries out a required memory amount notification process (described in detail later).

Steps S1106 to S1111 can be carried out through the same processing as in steps S406 to S411 in FIG. 4, and will therefore not be described here.

The required memory amount notification process carried out in step S1105 of FIG. 11 will be described next with reference to the flowchart in FIG. 12.

In step S1200, the CPU 110 carries out the developable image number calculation process. The developable image number calculation process is the same such as that described with reference to FIG. 5, and will therefore not be described here. The number of images that can be developed, calculated for the image quality parameters currently selected through the image quality setting portion 250, is represented by $F_{CAN}$.

In step S1201, the CPU 110 compares a frame number $F_{NEED}$, for the playback range located between the playback start position icon 241 and the playback end position icon 242 in the playback range, with $F_{CAN}$. If it is determined that $F_{NEED}$ is greater than $F_{CAN}$, the CPU 110 advances the process to step S1202, whereas if it is determined that $F_{NEED}$ is less than or equal to $F_{CAN}$, the CPU 110 ends the process.

In step S1202, the CPU 110 calculates a required memory amount $M_{NEED}$ through the following equation. Here, the variable N represents the output size of the developing result for a single frame image at the image quality parameters currently selected through the image quality setting portion 250.

$$M_{NEED}=N \times F_{NEED}$$

In step S1203, the CPU 110 communicates (displays) the required memory amount and stands by for a user operation. The display method will be described in detail later.

In step S1204, the CPU 110 determines whether or not the user has made an instruction to change the memory amount. If it is determined that the user has made an instruction to change the memory amount, the CPU 110 advances the process to step S1205, and if not, the CPU 110 ends the process.

In step S1205, the CPU 110 changes the memory amount to the value specified by the user in step S1203. Then, in step S1206, the CPU 110 carries out the developable image number calculation process and recalculates $F_{CAN}$.

Figure 12:
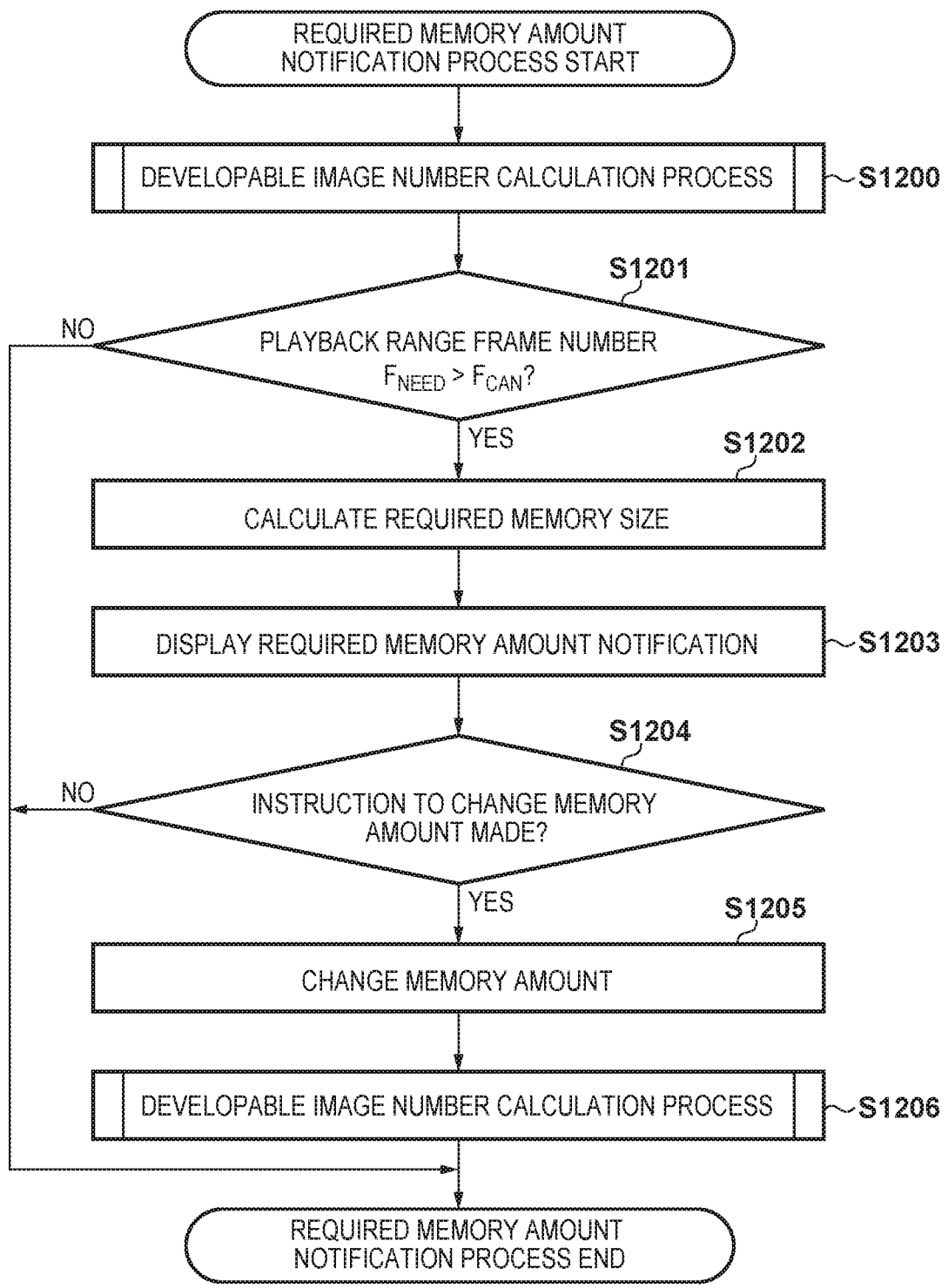
FIG. 12 is a flowchart illustrating a required memory amount notification processing sequence according to a second embodiment.

FIGS. 13A and 13B are diagrams illustrating an example of the display in detail, in a situation where the required memory amount notification has been made in step S1203 of FIG. 12. FIG. 13A is a display example for a situation where the required memory amount $M_{NEED}$ is less than or equal to an upper limit for the value that can be set. The memory amount currently set through the memory amount setting portion 251, and the required memory amount $M_{NEED}$, are displayed, and three buttons which can be pressed by the user are displayed. The messages written on the buttons are as follows, for example.

"change settings"
"change only this clip"
"no"

The application 200 operates in the following manner when these buttons are pressed.

When the "change settings" button has been pressed, the CPU 110 changes the memory amount set through the memory amount selling portion 251 to $M_{NEED}$. When the "change only this clip" button has been pressed, the CPU 110 temporarily changes the memory amount to $M_{NEED}$, and then returns the memory amount to the original value upon the input moving image data being changed or the application restarting. When the "no" button has been pressed, the CPU 110 does not change the memory amount set through the memory amount setting portion 251.

FIG. 13B is a display example for a situation where the required memory amount $M_{NEED}$ exceeds the upper limit for the value that can be set. The memory amount set through the memory amount selling portion 251, the required memory amount $M_{NEED}$, and an upper limit value $M_{MAX}$ for the memory amount that can be set, are displayed, and three buttons which can be pressed by the user are displayed. The messages written on the buttons are as follows, for example.

"change settings"
"change only this clip"
"no"

The application 200 operates in the following manner when these buttons are pressed.

When the "change settings" button has been pressed, the CPU 110 changes the memory amount set through the memory amount setting portion 251 to $M_{MAX}$. When the "change only this clip" button has been pressed, the CPU 110 temporarily changes the memory amount to $M_{MAX}$, and then returns the memory amount to the original value upon the input moving image data being changed or the application restarting. When the "no" button has been pressed, the CPU 110 does not change the memory amount set through the memory amount setting portion 251.

The developable range determination process in step S1106 of FIG. 11 is the same such as that described with reference to FIG. 6, and will therefore not be described here. However, in the present embodiment, the developable range is found in the following manner in step S601.

When either the playback start position icon 241 or the end position icon 242 for the playback range has not been finalized, the developing process is carried out on a number of frames equivalent to $F_{MARGIN}$ before the playback position icon 243, and the frames following the playback position icon 243. In other words, the range on which the developing process is carried out is found as $F_{NOW}-F_{MARGIN}\sim F_{NOW}+(F_{CAN}-F_{MARGIN})$.

If both the playback start position icon 241 and the playback end position icon 242 of the playback range have been finalized, the developing process is carried out on the number of frames equivalent to $F_{MARGIN}$ after the playback start position icon 241, and the frames following the playback position icon 243. In other words, the range on which the developing process is carried out is found as $F_{START}\sim F_{START}+F_{MARGIN}$ and $F_{NOW}\sim F_{NOW}+(F_{CAN}-F_{MARGIN})$.

Parts for which the endpoint falls outside the playback range are allocated to the frames following $F_{START}$, in the same manner as in the first embodiment.

In the present second embodiment, $F_{MARGIN}$ is the number of frames present in three seconds' worth of the input moving image data. However, $F_{MARGIN}$ may be set to be in a constant proportion to $F_{CAN}$, or may be determined on the basis of the number of frames constituting the input moving image data. The configuration may also be such that $F_{MARGIN}$ can be changed in accordance with the position of the mouse pointer or the like. For example, consider a case where when both the playback start position icon 241 and the playback end position icon 242 of the playback range are finalized, the frames following the playback position icon 243 are increased ($F_{MARGIN}$ is reduced) when the mouse pointer is above the playback start button, and the frames following the playback start position icon 241 are increased ($F_{MARGIN}$ is increased) when the mouse pointer is above the jump button for jumping to the playback start position.

Furthermore, in the present second embodiment, the method for determining whether or not the playback start position icon 241 and the playback end position icon 242 of the playback range are finalized is as follows. It is assumed that the default positions of the playback start position icon 241 and the playback end position icon 242 immediately after the input moving image data has been selected are set to the first frame and last frame, respectively, of the input moving image data. The playback start position icon 241 and the playback end position icon 242 are determined to have been finalized once a set amount of time has passed after the user has set both of those icons to a frame located at a position aside from the default position. Of course, another determination method may be used instead.

Effects such as those described below can be achieved by determining the range for the developing process as described here. First, when neither the playback start position icon 241 nor the playback end position icon 242 are finalized, it is conceivable for the user to carry out an operation for searching for a suitable frame while repeatedly moving the playback position icon 243 and starting the playback in a narrow range on the seek bar portion 240. When such an operation is carried out, generating developing results for areas before and after the playback position icon 243 makes it possible to display a preview immediately after the user operation. After the playback start position icon 241 and the playback end position icon 242 have been finalized, it is conceivable that the user will start the playback from the playback position icon 243, or start the playback after jumping to the playback start position icon 241 and then confirm the input moving image data, and thus the same effects can be obtained by generating the developing results for immediately after these two positions.

The developing process in step S1108 in FIG. 11 will be described next with reference to the flowchart in FIGS. 14A and 14B. In the developing process, the frames in the developable range, found through the developable range determination process, are developed with respect to the image quality parameters currently selected through the image quality setting portion 250. When the playback start position icon 241 and the playback end position icon 242 are finalized, the frames before and after the playback position icon 243 are developed in an alternating manner, and when the icons are not finalized, the frames after the playback position icon 243 and after the playback start position icon 241 are developed in an alternating manner.

Steps S1400 to S1409 are the same processes as steps S700 to S709 in FIG. 7, and will therefore not be described; the descriptions will start from step S1410.

In step S1410, the CPU 110 determines whether or not the playback range (the playback start position icon 241 and the playback end position icon 242) are finalized. If it is determined that the playback range has not been finalized, the CPU 110 advances the process to step S1411, whereas if it is determined that the playback range has been finalized, the CPU 110 advances the process to step S1419.

In step S1411, the CPU 110 substitutes $F_{NOW}-1$ for a variable F'. Then, in step S1412, the CPU 110 compares the variable F' with $F_{NOW}-F_{MARGIN}$. If it is determined that the variable F' is lower than $F_{NOW}-F_{MARGIN}$, the CPU 110 advances the process to step S1427, and if not, the CPU 110 advances the process to step S1413.

In step S1413, the CPU 110 determines whether or not the image data corresponding to the developing result for the F'th frame in the input moving image data is present in the developing result saving region of the RAM 130. If it is determined that the image data for the developing result of the F'th frame is present in the developing result saving region of the RAM 130, the CPU 110 advances the process to step S1418, and if not, the CPU 110 advances the process to step S1414.

In step S1414, the CPU 110 reads the data of the F'th frame in the input moving image data. Then, in step S1415, the CPU 110 carries out the developing process on the data of the frame read in step S1414, and generates the F'th image data. This developing process is the same as in step S1404, and will therefore not be described here. In step S1416, the CPU 110 stores the image data of the developing result in the developing result saving region of the RAM 130. In step S1417, the CPU 110 sets a developing complete display for the F'th frame in the input moving image data to "on". The display method will be described in detail later. In step S1418, the CPU 110 subtracts 1 from the variable F'.

In step S1419, the CPU 110 substitutes $F_{START}$ for the variable F'. Then, in step S1420, the CPU 110 compares the variable F' with $F_{START}+F_{MARGIN}$. If it is determined that the variable F' is greater than $F_{START}+F_{MARGIN}$, the CPU 110 advances the process to step S1427, and if not, the CPU 110 advances the process to step S1421.

In step S1421, the CPU 110 determines whether or not the image data corresponding to the developing result for the F'th frame in the input moving image data is present in the developing result saving region of the RAM 130. If it is determined that the image data for the F'th frame is present in the developing result saving region of the RAM 130, the CPU 110 advances the process to step S1426, and if not, the CPU 110 advances the process to step S1422.

Steps S1422 to S1425 are the same processing as in steps S1414 to S1417, and will therefore not be described.

In step S1426, the CPU 110 adds 1 to the variable F'.

Step S1427 is the same determination process as step S710 in FIG. 7, and will therefore not be described here.

As a result of the foregoing, when the position of the playback position icon 243 is changed, the developing process is carried out on the undeveloped frame closest to the position indicated by the playback position icon 243 after the change, and the image data of the frames not yet played back continues to be stored in the developing result saving region. Thus when the user has changed the position of the playback position icon 243, the likelihood that that position is a developed frame increases steadily, and thus the playback can be expected to be smooth when an instruction for playback is received.

Although the present second embodiment describes developing the frames in two locations alternately one frame at a time, the developing order may be determined through another method instead. For example, it is conceivable to develop several frames following the playback position icon 243 when the mouse pointer is above the playback start button, develop several frames following the playback start position icon 241 when the mouse pointer is above the jump button for jumping to the playback start position, or the like.

Figure 15:
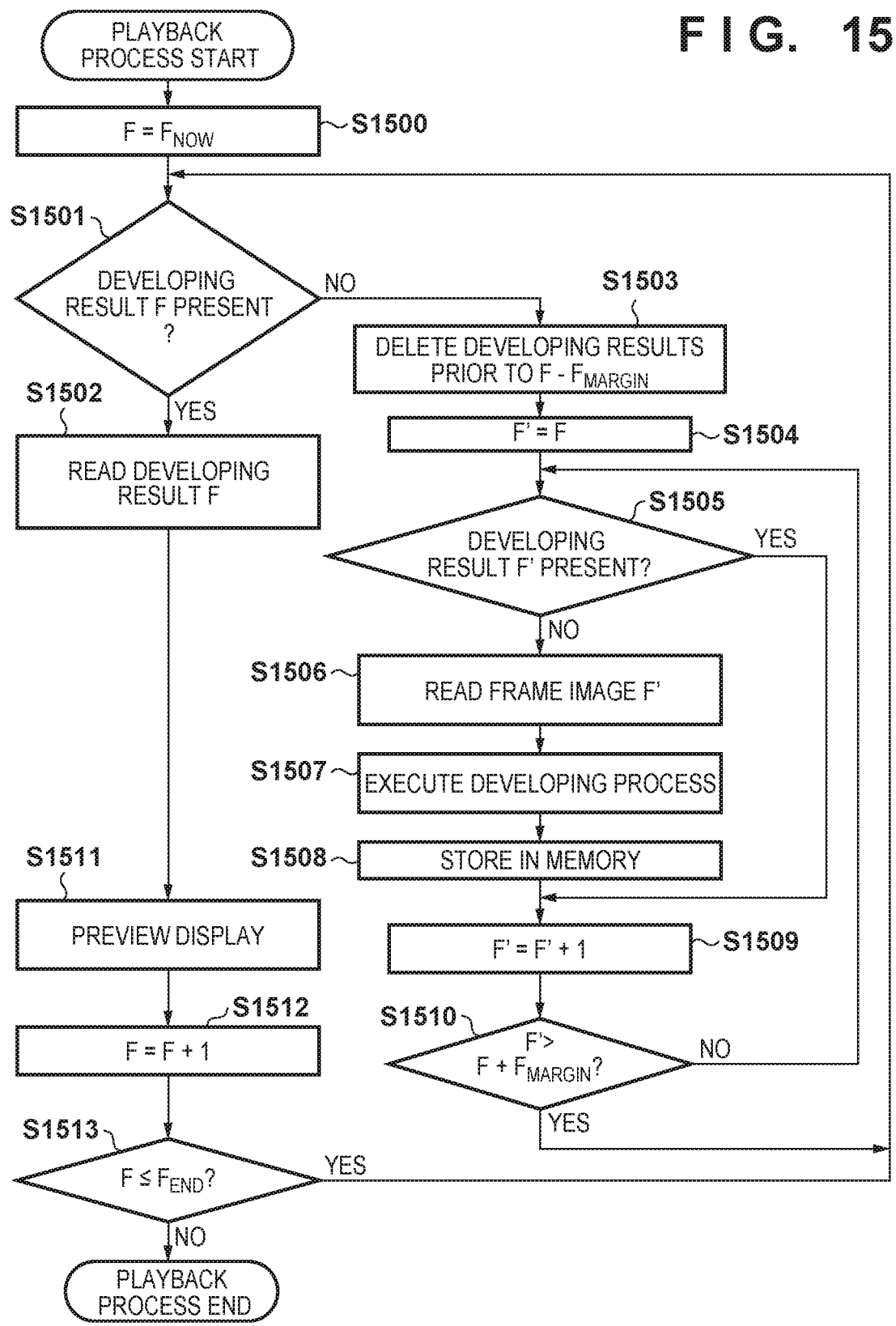
FIG. 15 is a flowchart illustrating a playback processing sequence according to the second embodiment.

The playback process of step S1110 in FIG. 11 will be described next with reference to the flowchart in FIG. 15. The present second embodiment will describe an example in which when an attempt is made to playback a frame for which no developing result is present, the developing process is carried out collectively on a plurality of frames; as a result, the preview display is paused, and the preview for that range is then displayed smoothly thereafter, with these operations being repeated.

Figure 8:
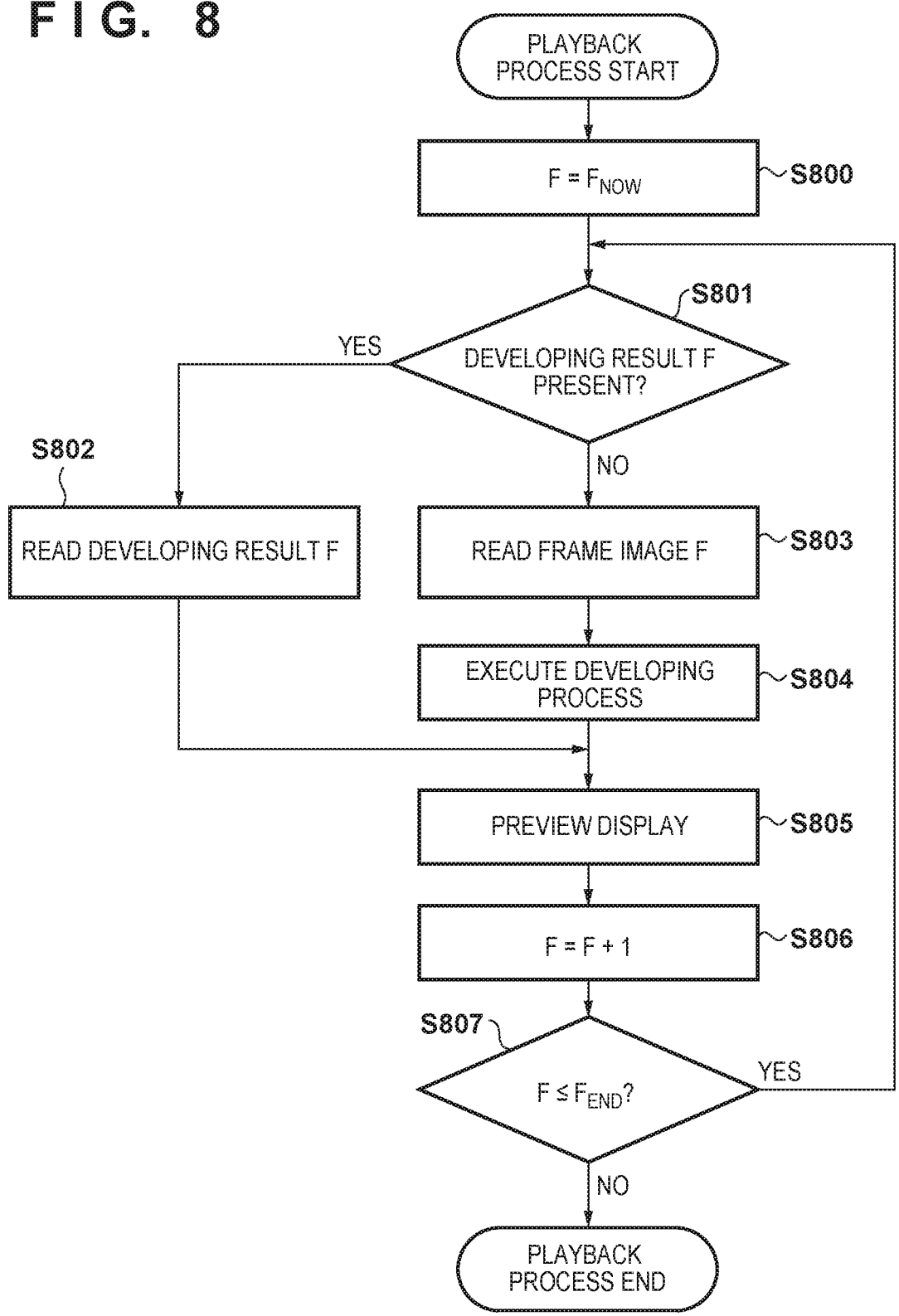
FIG. 8 is a flowchart illustrating a playback processing sequence according to an embodiment.

Steps S1500 to S1502 are the same processes as steps S800 to S802 in FIG. 8, and will therefore not be described here.

In step S1503, the CPU 110 frees up memory by deleting the developing results for the frames before $F-F_{MARGIN}$, among the existing developing result saved in the RAM 130.

In step S1504, the CPU 110 substitutes F for the variable F'.

Figure 14B:
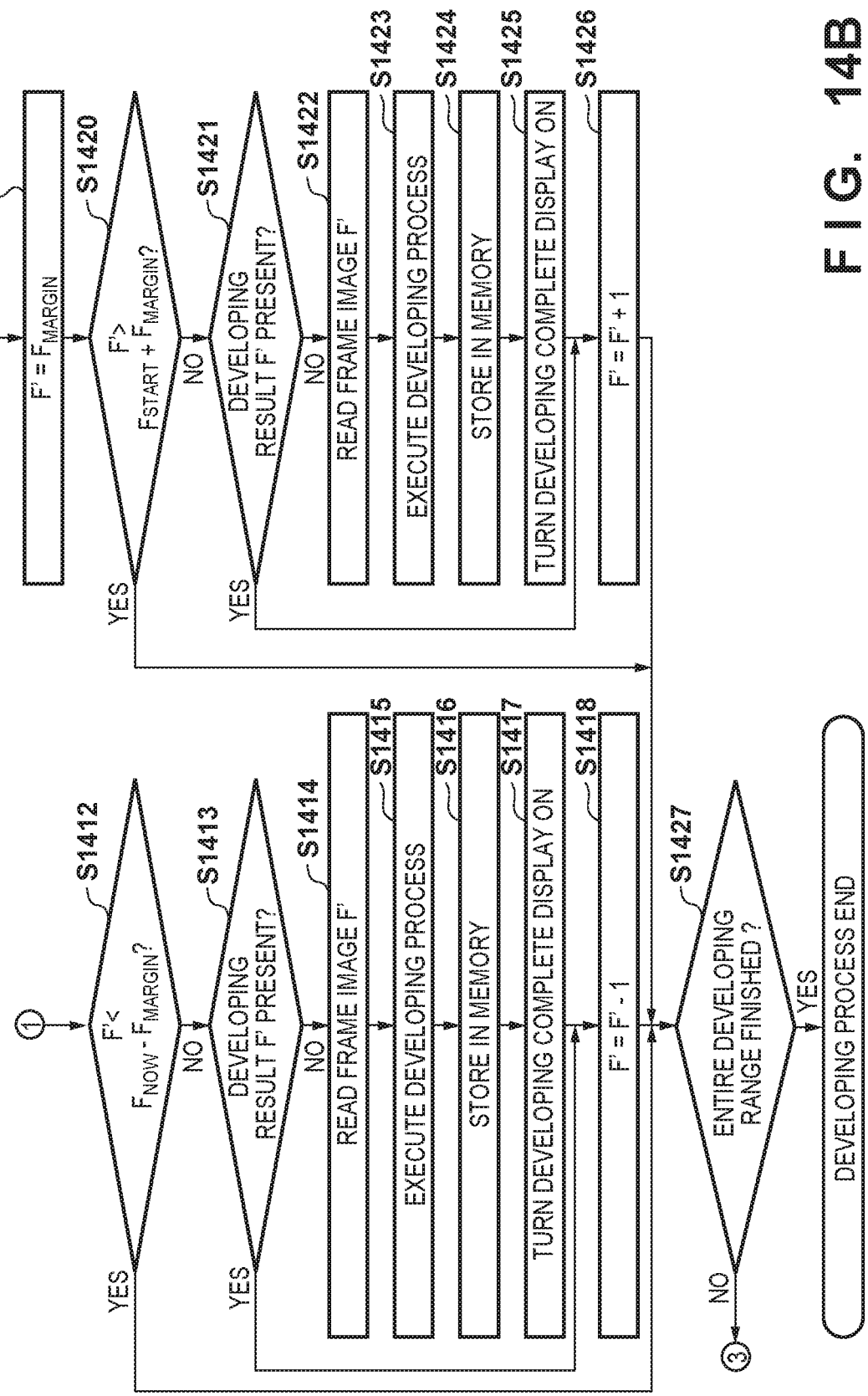

Steps S1505 to S1509 are the same as steps S1421 to S1424 and S1426 in FIGS. 14A and 14B, and will therefore not be described.

In step S1510, the CPU 110 compares the variable F' with $F+F_{MARGIN}$. If it is determined that the variable F' is greater than $F+F_{MARGIN}$, the CPU 110 advances the process to step S1501, and if not, the CPU 110 advances the process to step S1505.

Steps S1511 to S1513 are the same as steps S805 to S807 in FIG. 8, and will therefore not be described.

Figure 16A:
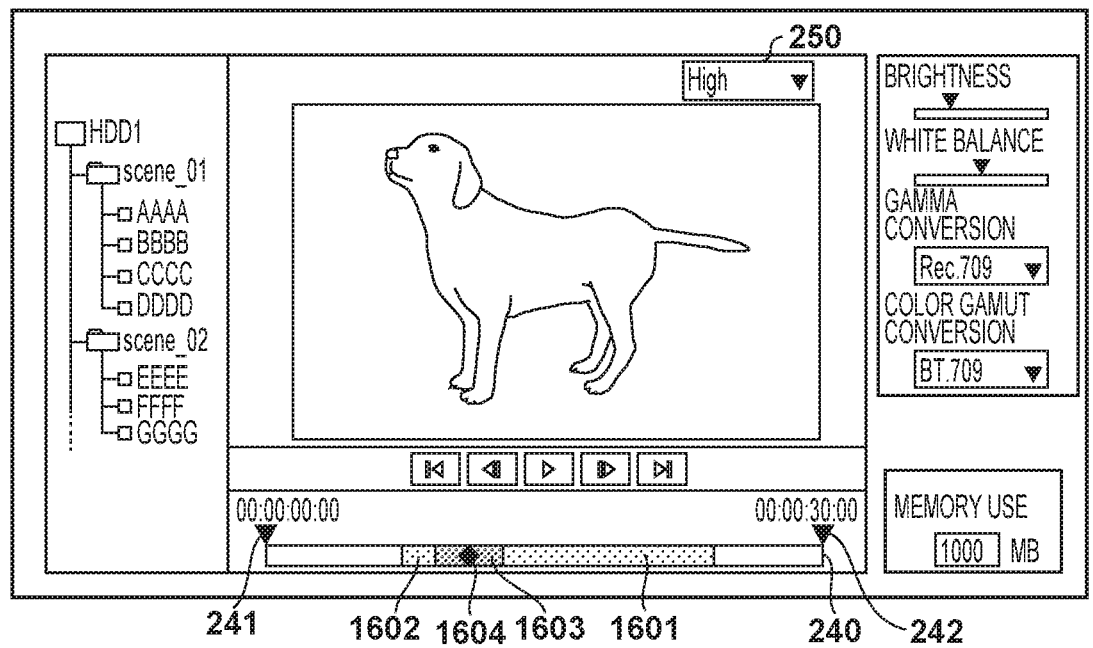
FIGS. 16A and 16B are diagrams illustrating examples of a GUI according to the second embodiment.
Figure 16B:
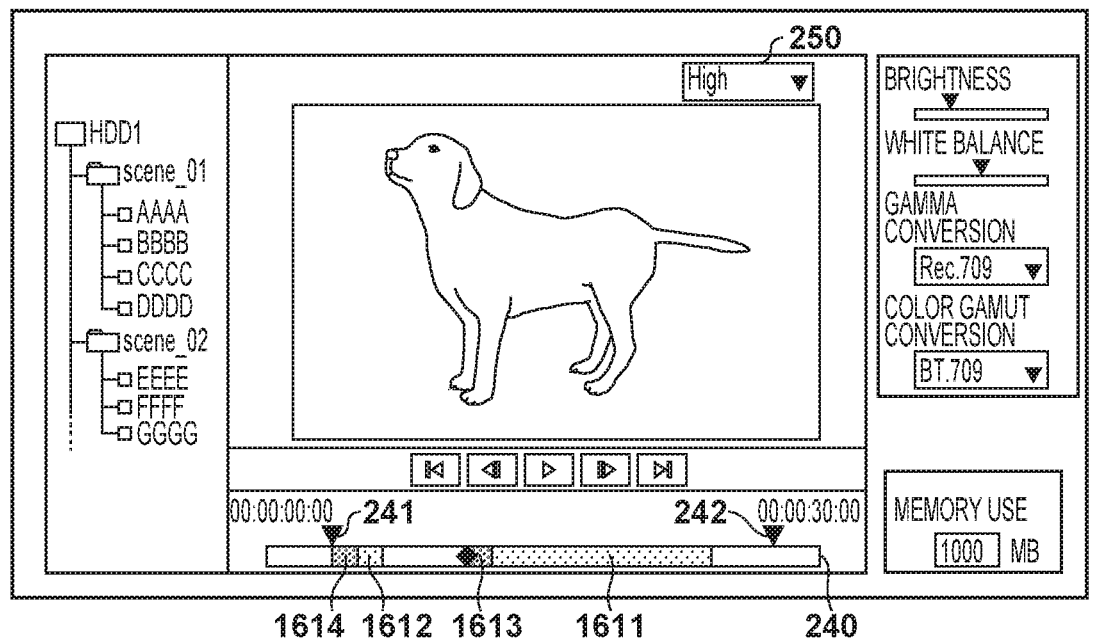

FIGS. 16A to 16B are diagrams illustrating details of the display configuration of the GUI in FIG. 2, for a case where the developable display in step S601 of FIG. 6 and the developing complete display in steps S1406, S1417, and S1425 of FIGS. 14A and 14B have been carried out for only the image quality parameters currently selected throng, the image quality setting portion 250.

FIG. 16A is a display example for a situation where neither the playback start position icon 241 nor the playback end position icon 242 is finalized. In the seek bar portion 240, a part 1601 ($F_{NOW}-F_{NOW}+(F_{CAN}-F_{MARGIN})$) and a part 1602 ($F_{NOW}-F_{MARGIN}-F_{NOW}$) corresponding to the developable range are displayed in light gray, and parts 1603 and 1604 corresponding to the developed range are displayed in dark gray. Thereafter, the part 1603 extends rearward and the part 1604 extends forward, and after coinciding with the part 1602, the part 1604 extends rearward until only the part 1603 coincides with the part 1601.

FIG. 16B is a display example for a situation where the playback start position icon 241 and the playback end position icon 242 are finalized. In the seek bar portion 240, a part 1611 ($F_{NOW}$~$F_{NOW}$+($F_{CAN}$−$F_{MARGIN}$)) and a part 1612 ($F_{START}$~$F_{START}$+$F_{MARGIN}$) corresponding to the developable range are displayed in light gray, and parts 1613 and 1614 corresponding to the developed range are displayed in dark gray. Thereafter, the parts 1613 and 1614 both extend rearward, and after coinciding with the part 1612, the part 1614 extends rearward until only the part 1613 coincides with the part 1611.

According to the present second embodiment as described thus far, notifying the user of the required memory amount and inquiring with the user as to whether or not to change the settings at that time make it possible for the user to quickly set the memory amount for playing back his or her desired playback range at a high playback quality. This eliminates the need for the user to repeatedly change the memory amount and confirm the playback range, and makes it possible to carry out the intended playback having changed the memory amount only once. Additionally, carrying out the developing process preferentially on a range highly likely to be displayed by the user next, in accordance with the state of user operations, makes it possible to carry out the display immediately after the user operation.

Third Embodiment

The foregoing first embodiment described an example of a PC that calculates and displays the developed range and the developable range for each of the image quality parameters. The second embodiment described an example of a PC in which whether a specified playback range can be developed is communicated on the basis of the memory amount that can be used, and the user can then select whether or not to change the memory amount. The present third embodiment will describe an example of a PC in which both the image quality parameters and the memory amount can be changed simultaneously. Additionally, the first embodiment described an example of the PC in which the developing process is not carried out during the playback process. The present embodiment will describe an example of the PC in which the developing process is carried out even during the playback process. Furthermore, the present embodiment will also describe an example of a PC in which the required memory amount is displayed during user operations for specifying the playback range.

In the present third embodiment, the block diagram illustrating the configuration of the PC, the diagram illustrating the configuration of the GUI of the application 200, and the conceptual diagram illustrating the RAW moving-image data stored in the recording medium 150 are all the same as FIGS. 1 to 3 described with reference to the first embodiment, and will therefore not be described here. However, the present third embodiment assumes that the method for specifying the playback start position icon 241 and the playback end position icon 242 includes a drag-and-drop operation on the seek bar portion 240. Display examples of the GUI during this operation will be described later.

Moving image playback operations according to the present third embodiment will be described next with reference to FIGS. 17 to 19B.

The flowchart illustrating the operations of the application 200 during RAW moving-image playback is assumed to be the same as FIG. 11 described in the second embodiment, and therefore will not be described here. However, it is assumed that the developing process is not suspended in step S1109 of FIG. 11. When the PC has a sufficiently high processing speed, the developing process started in step S1108 is continued even during the playback process of step S1110, which makes it possible to generate developing results for more frames before the preview display. However, it is assumed that if there is no space in the developing result saving region when the developing process is carried out during the playback process, the developing results are deleted in order from those displayed when the playback process was started.

The required memory amount notification process carried out in step S1105 of FIG. 11 will be described next with reference to the flowchart in FIG. 17.

Steps S1700 to S1701 are the same processes as steps S1200 to S1201 in FIG. 12, and will therefore not be described.

In step S1702, the CPU 110 calculates required memory amounts $M_H$ $M_M$, and $M_L$ for all of the image quality parameters that can be set through the image quality setting portion 250, according to the following equations. The output sizes of the developing results at each of the image quality parameters are represented by $N_H$, $N_M$, and $N_L$ bytes, respectively.

$$M_H = N_H \times F_{NEED}$$

$$M_M = N_M \times F_{NEED}$$

$$M_L = N_L \times F_{NEED}$$

In step S1703, the CPU 110 displays a required memory amount notification and stands by for a user operation. The display method will be described in detail later.

In step S1704, the CPU 110 determines whether or not the user has made an operation for changing the image quality parameters or the memory amount with respect to the display made in step S1703. If it is determined that the user has made one of these operations, the CPU 110 advances the process to step S1705, whereas when it is determined that the user has not made any of these operations, the CPU 110 ends the required memory amount notification process.

In step S1705, the CPU 110 changes the image quality parameters or the memory amount to the value specified by the user in step S1703. Then, in step S1706, the CPU 110 carries out the developable image number calculation process.

Figure 17:
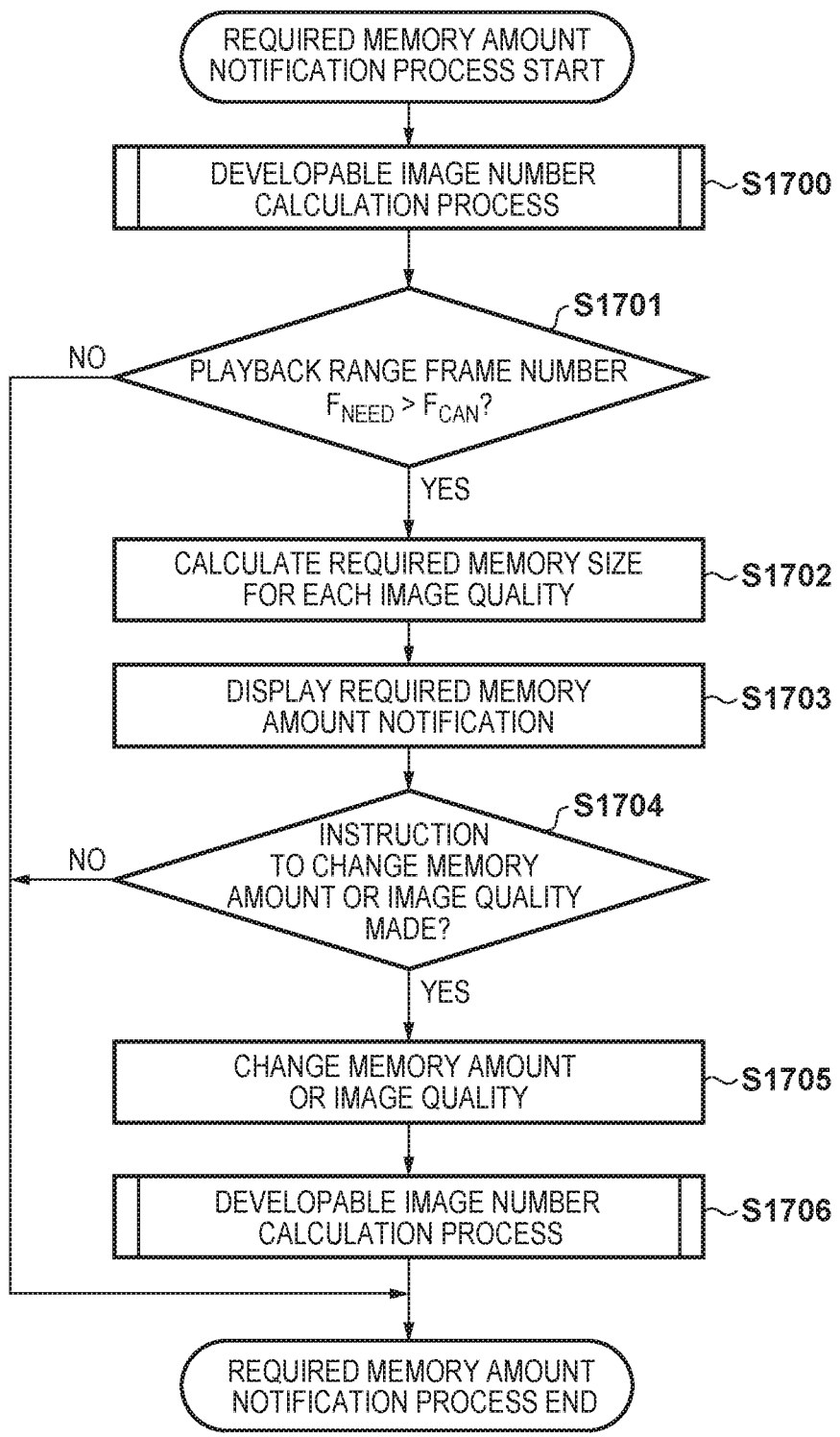
FIG. 17 is a flowchart illustrating a required memory amount notification processing sequence according to a third embodiment.

The developable image number calculation process carried out in steps S1700 and S1706 of FIG. 17 is the same such as that described with reference to FIG. 5, and will therefore not be described here. However, in the present third embodiment, the developable image number $F_{CAN}$ is calculated in accordance with the following equation.

$$F_{CAN} = \text{FLOOR}(M/N) + F_{WILL}$$

Here, $F_{WILL}$ is the number of frames on which the developing process can be carried out while a number of frames equivalent to FLOOR(M/N) is being played back. $F_{WILL}$ is assumed to be calculated by estimating the capabilities of the CPU 110, the GPU 120, and so on. Note that $F_{WILL}$ may be calculated on the basis of the execution speed of the first instance of the developing process carried out after the application 200 has been launched.

FIG. 18 is a diagram illustrating, in detail, the configuration of the display in a situation where the required memory amount notification has been made in step S1703 of FIG. 17.

The image quality parameters currently selected through the image quality setting portion 250, the memory amount set through the memory amount setting portion 251, and the value of the upper limit on the memory amount that can be set are displayed. Furthermore, the required memory amount for each of the image quality parameters is displayed through a drop-down list GUI, and the user can select one of those amounts. The rows for image quality parameters which exceed the upper limit value which can be set for the required memory amount are grayed out in the drop-down list. Like FIG. 13, three buttons are displayed as well. The message is displayed for those buttons are the same as in FIG. 13, namely "change settings", "change only this clip", and "no". The application 200 operates in the following manner when these buttons are pressed.

when the "change settings" button has been pressed, the CPU 110 changes the image quality parameters and the memory amount to those selected through the drop-down list.

when the "change only this clip" button has been pressed, the CPU 110 temporarily changes the image quality parameters and the memory amount to those selected through the drop-down list, and then restores the original values when the input moving image data is changed.

when the "no" button has been pressed, the CPU 110 does not change the memory amount.

Note that the configuration may be such that image quality parameters exceeding the upper limit value which can be set for the required memory amount are not grayed out in the drop-down list, and can be selected, with a warning indicating that the upper limit value which can be set for the memory amount will be set being displayed when the user selects those image quality parameters.

The developable range determination process in step S1106 of FIG. 11, the developing process in step S1108 of FIG. 11, and the playback process in step S1110 of FIG. 11 are the same as those in FIGS. 6, 7, and 8, and will therefore not be described here.

A method for specifying the playback start position icon 241 and the playback end position icon 242 through drag-and-drop operations made on the seek bar portion 240 will be described with reference to FIGS. 19A and 19B.

When the user drags the mouse along the seek bar portion 240, the drag start position is displayed as a preliminary playback start position icon 1901. The memory amount required when the mouse pointer position is taken as the preliminary playback end position is calculated in real time during the drag operation, and the calculated memory amount is displayed in a callout 1902 above the mouse pointer. Once the drag operation ends, the starting position and ending position of the drag operation are set as the playback start position icon 241 and the playback end position icon 242, respectively.

Figure 19A:
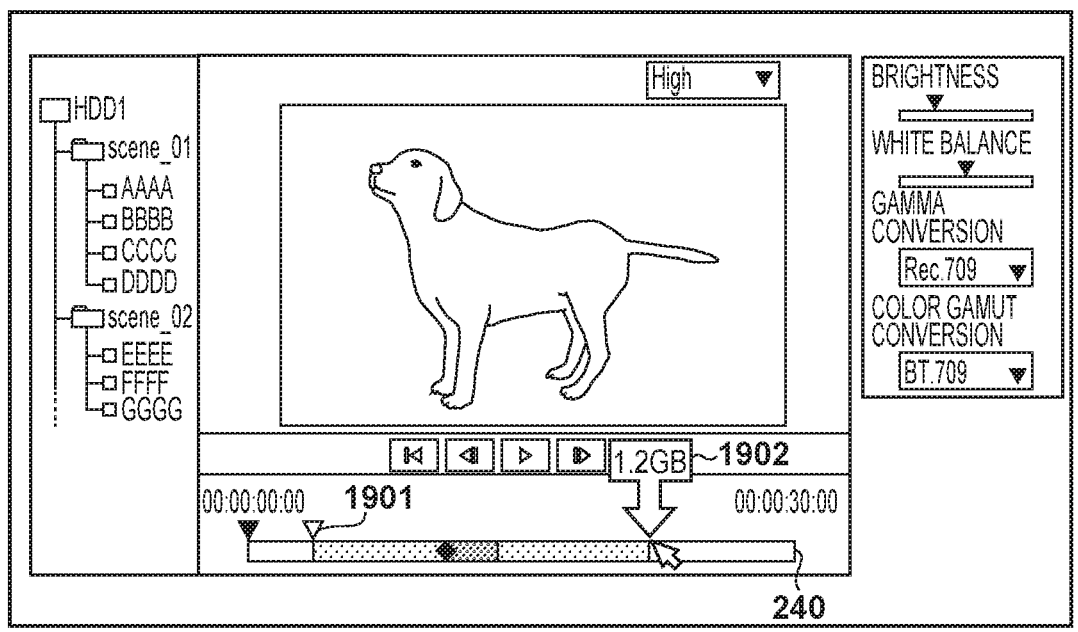
FIGS. 19A and 19B are diagrams illustrating examples of a GUI according to the third embodiment.

FIG. 19A is a display example for a situation where the required memory amount calculated during the drag operation is less than or equal to an upper limit for the value that can be set for the memory amount.

Figure 19B:
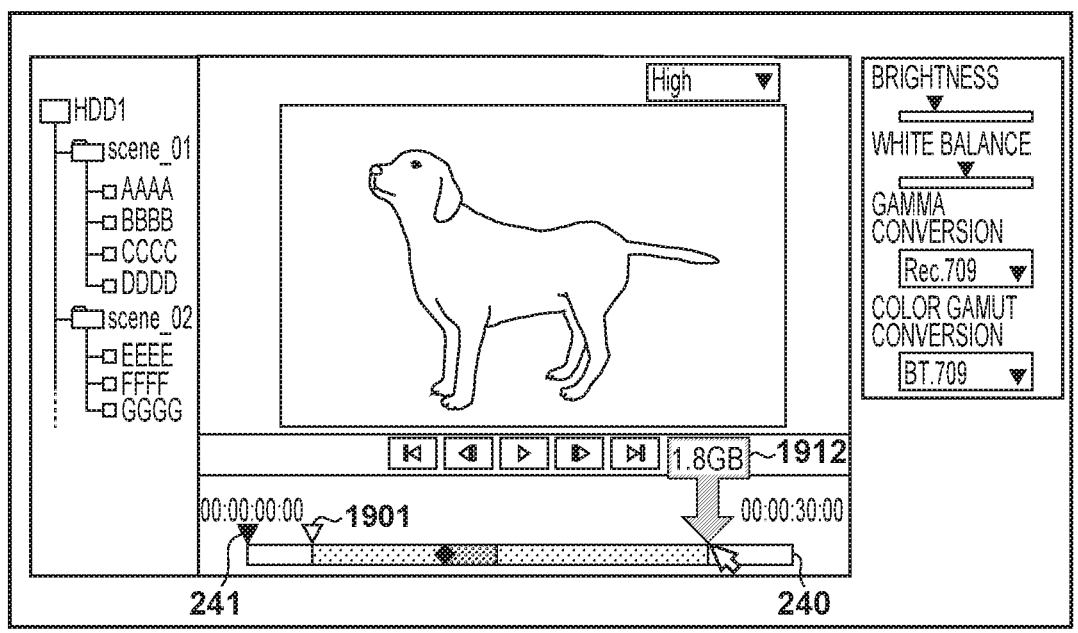

FIG. 19B is a display example for a situation where the required memory amount calculated during the drag operation exceeds the upper limit for the value that can be set for the memory amount. To notify the user that the memory amount calculated at this time exceeds the upper limit value, the CPU 110 displays the illustrated callout 1912, including the calculated memory amount. At this time, the CPU 110 changes the display format of the callout 1912 (the display color, in the present embodiment) so as to display the callout 1912 with greater emphasis than the callout 1902.

Thus according to the present third embodiment, the user is notified of the memory amounts required for all of the image quality parameters that can be selected, and at the same time, the user is asked whether or not to change the settings, which makes it possible for the user to quickly set a combination of the image quality parameters and the memory amount for playing back a desired playback range at a high playback quality. This eliminates the need for the user to repeatedly change the image quality parameters and memory amount and confirm the playback range, and makes it possible to carry out the intended playback having made the settings only once. Furthermore, carrying out the playback process in the developing process in parallel makes it possible to develop more frames immediately before the playback. Further still, the required memory amount is displayed in real time during the user operation for specifying the playback range, which makes it possible for the user to set the playback range while being careful of the memory amount.

Although the foregoing has described preferred embodiments of the present invention, the present invention is not intended to be limited to the specific embodiments, and all variations that do not depart from the essential spirit of the invention are intended to be included in the scope of the present invention. Some of the above-described embodiments may be combined as appropriate.

The object of the present invention can also be achieved by executing the following processing.

First, a storage medium (or recording medium) in which software program code for realizing the functions of the aforementioned embodiments is recorded is supplied to a system or apparatus. A computer (or CPU, MPU, or the like) in that system or apparatus then reads out and executes the program code stored in the recording medium. In such a case, the program code itself read out from the storage medium implements the functionality of the aforementioned embodiments, and the storage medium in which the program code is stored constitutes the present invention.

Additionally, the computer executing the program code which has been read out not only implements the functions of the aforementioned embodiments, but can also achieve the following. That is, on the basis of instructions and the program code that has been read out, an operating system (OS) or the like running on the computer carries out some or all of the actual processing, and the functions of the aforementioned embodiments are realized through that processing. A hard disk, ROM, RAM, non-volatile storage medium, CD-ROM, CD-R, DVD, optical disk, magneto-optical disk, MO, and the like are conceivable as examples of the storage medium for storing this program code. A computer network such as a local area network (LAN) or wide area network (WAN) can also be used for supplying the program code.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-019070, filed on Feb. 5, 2019, and Japanese Patent Application No. 2019-019072, filed on Feb. 5, 2019, which are hereby incorporated by reference herein in their entirety.

What is claimed is:

1. An information processing apparatus configured to carry out a playback process on a RAW moving-image, the apparatus comprising:
  one or more processors; and
  a memory storing instructions which, when the instructions are executed, cause one or more processors to function as:
  an image processing unit configured to generate a processed moving image by carrying out image processing, including a developing process, on the RAW moving-image;
  a storing unit configured to store the processed moving image generated by the image processing unit in a buffer memory; and
  a display control unit configured to carry out control so that a bar corresponding to the length of a time axis of the RAW moving-image is displayed in a display unit,
  wherein the display control unit is configured to display, along with the bar, a processable range of the RAW moving-image, in which the moving image generated by carrying out the image processing on the RAW moving image by the image processing unit can be stored in the buffer memory, before the image processing on the RAW moving-image in the processable range is completed.

2. The apparatus according to claim 1, wherein the display control unit is configured to display the processable range, as well as a processed range of the RAW moving-image on which the image processing has already been carried out by the image processing unit, along with the bar.

3. The apparatus according to claim 1, wherein the display control unit is configured to carry out control so that a moving image played back on the basis of processed moving image data stored in the memory is displayed in the display unit.

4. The apparatus according to claim 1, wherein the display control unit is configured to carry out control so that the processable range is displayed within the bar.

5. The apparatus according to claim 4, wherein the display control unit is configured to carry out control so that the processable range is displayed with different colors in the bar to make the processable range distinguishable.

6. The apparatus according to claim 1, wherein the display control unit is configured to determine the processable range in accordance with an output size of processed moving image data generated by the image processing carried out by the image processing unit, and a memory amount in the memory.

7. The apparatus according to claim 6, wherein the one or more processors further function as a determining unit configured to calculate a number of frames which can be stored in the memory on the basis of the output size of the processed moving image data and the memory amount in the memory, and determine a processable range on the basis of the calculated number of frames,
  wherein the display control unit is configured to carry out control so that the processable range determined by the determining unit is displayed along with the bar.

8. The apparatus according to claim 1, wherein the one or more processors further function as an image quality setting unit configured to set an image quality level in the image processing carried out by the image processing unit.

9. The apparatus according to claim 8, wherein in response to the settings for the image quality level being changed by the image quality setting unit, the image processing unit is configured to start the image processing on the basis of the post-change image quality level, and the display control unit is configured to display a processable range corresponding to the post-change image quality level.

10. The apparatus according to claim 8, wherein the display control unit is configured to carry out control so that the image quality level set by the image quality setting unit and a processable range determined in accordance with the memory amount in the memory are displayed.

11. The apparatus according to claim 10, wherein the display control unit is configured to display the processable range corresponding to the image quality level set by the image quality setting unit in the bar, and to display information indicating a processable range occurring when the image quality level has been changed to another image quality level which can be set by the image quality setting unit.

12. The apparatus according to claim 8, wherein the display control unit is configured to carry out control so that a processable range corresponding to an image quality level is displayed for each of a plurality of image quality levels which can be set by the image quality setting unit.

13. The apparatus according to claim 8, further comprising a playback range setting unit configured to set a playback range in the moving image data,
  wherein the image quality setting unit is configured to display an image quality menu for a user to set an image quality level from among a plurality of image quality levels in the display unit, and when displaying the image quality menu, displays an image quality level at which the entire playback range set by the playback range setting unit is included in the processable range, and an image quality level at which the entire playback range set by the playback range setting unit is not included in the processable range, so as to be distinguishable from each other.

14. The apparatus according to claim 13, wherein when displaying the image quality menu, the image quality setting unit also displays a memory amount required for the playback range set by the playback range setting unit to be included in the processable range, for each of the plurality of image quality levels.

15. The apparatus according to claim 1, wherein the one or more processors further function as a memory amount setting unit configured to set a memory amount of the memory,
    wherein the display control unit is configured to carry out control so that a processable range determined in accordance with the memory amount set by the memory amount setting unit is displayed.

16. The apparatus according to claim 15, wherein in response to the settings for the memory amount being changed by the memory amount setting unit, the image processing unit starts the image processing on the basis of the post-change memory amount, and the display control unit carries out control so that a processable range corresponding to the post-change memory amount is displayed.

17. The apparatus according to claim 1, wherein the one or more processors further function as a playback position setting unit configured to set a playback position in the moving image,
    wherein in response to the playback position setting being changed by the playback position setting unit, the image processing unit starts the image processing from undeveloped moving image data corresponding to the post-change playback position, and the display control unit carries out control so that a processable range including the post-change playback position is displayed.

18. An information processing method of carrying out a playback process on a RAW moving-image, the method comprising:
    generating a processed moving image by carrying out image processing, including a developing process, on the RAW moving-image;
    storing, in a buffer memory, the processed moving image; and
    carrying out control so that a bar corresponding to the length of a time axis of the RAW moving-image is displayed,
    displaying, along with the bar, a processable range of the RAW moving-image in which, the moving image generated by carrying out the image processing on the RAW moving image can be stored in the buffer memory, before the image processing on the RAW moving-image in the processable range is completed.

19. A non-transitory computer readable storage medium storing a program that, when read and executed by a computer, causes the computer to execute the steps of an information processing method of carrying out a playback process on a RAW moving-image, the method comprising:
    generating a processed moving image by carrying out image processing, including a developing process, on the RAW moving-image;
    storing, in a buffer memory, the processed moving image; and
    carrying out control so that a bar corresponding to the length of a time axis of the RAW moving-image is displayed,
    displaying, along with the bar, a processable range of the RAW moving-image, in which, the moving image generated by carrying out the image processing on the RAW moving image can be stored in the buffer memory, before the image processing on the RAW moving-image in the processable range is completed.

* * * * *